US008819197B2

(12) United States Patent
Iizuka

(10) Patent No.: US 8,819,197 B2
(45) Date of Patent: Aug. 26, 2014

(54) SOFTWARE EVALUATION METHOD AND SOFTWARE EVALUATION SYSTEM

(75) Inventor: Toshiaki Iizuka, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 2356 days.

(21) Appl. No.: 11/398,215

(22) Filed: Apr. 5, 2006

(65) Prior Publication Data

US 2006/0253824 A1 Nov. 9, 2006

(30) Foreign Application Priority Data

Apr. 7, 2005 (JP) .................................. 2005-111285
Jan. 13, 2006 (JP) .................................. 2006-006076

(51) Int. Cl.
*G06F 15/177* (2006.01)
*G06F 15/173* (2006.01)

(52) U.S. Cl.
USPC .......................................... 709/221; 709/223

(58) Field of Classification Search
CPC . H04L 41/0213; G06F 3/1204; G06F 3/1203; G06F 3/1225; G06F 3/1236
USPC ........................................................ 709/221
See application file for complete search history.

(56) References Cited

U.S. PATENT DOCUMENTS

| 6,256,750 | B1 * | 7/2001 | Takeda ........................... 714/11 |
| 7,516,450 | B2 * | 4/2009 | Ogura ........................... 717/168 |
| 2001/0044822 | A1 * | 11/2001 | Nishio ........................... 709/202 |
| 2003/0020948 | A1 * | 1/2003 | Jarvis et al. .................. 358/1.15 |
| 2003/0174360 | A1 * | 9/2003 | Ohshima ....................... 358/1.15 |
| 2004/0039811 | A1 * | 2/2004 | Nakamura et al. ............ 709/223 |
| 2004/0120001 | A1 * | 6/2004 | Boldon ......................... 358/1.15 |
| 2004/0135805 | A1 * | 7/2004 | Gottsacker et al. ........... 345/751 |
| 2004/0148379 | A1 * | 7/2004 | Ogura ........................... 709/223 |
| 2004/0252331 | A1 * | 12/2004 | Wei ............................... 358/1.15 |
| 2005/0166184 | A1 * | 7/2005 | Takao ........................... 717/117 |

FOREIGN PATENT DOCUMENTS

| JP | 09-044433 A | 2/1997 |
| JP | 2000-132362 A | 5/2000 |
| JP | 2003-046569 A | 2/2003 |
| JP | 2004-341700 A | 12/2004 |

* cited by examiner

*Primary Examiner* — Peling Shaw
(74) *Attorney, Agent, or Firm* — Canon U.S.A., Inc. IP Division

(57) ABSTRACT

A portion of receiver software includes of a device information receiving section bound to an IP address corresponding to a virtual managed printer. The device information receiving section, as ported receiver software, receives distribution from an integrated management printer. As a result, one simulator agent PC can act as numerous managed printers that receive distribution from the integrated management printer.

7 Claims, 34 Drawing Sheets

FIG.31

[PORT⇔VIRTUAL PRINTER IP ADDRESS CONVERSION TABLE]

| PORT | | IP ADDRESS OF VIRTUAL PRINTER |
|---|---|---|
| 501 | ⇔ | 172. 24. 2. 1 |
| 502 | ⇔ | 172. 24. 2. 2 |
| 503 | ⇔ | 172. 24. 2. 3 |
| 504 | ⇔ | 172. 24. 2. 4 |
| 505 | ⇔ | 172. 24. 2. 5 |
| 506 | ⇔ | 172. 24. 2. 6 |
| 507 | ⇔ | 172. 24. 2. 7 |
| 508 | ⇔ | 172. 24. 2. 8 |
| 509 | ⇔ | 172. 24. 2. 9 |
| 510 | ⇔ | 172. 24. 2. 10 |

SOFTWARE EVALUATION METHOD AND SOFTWARE EVALUATION SYSTEM

BACKGROUND OF THE INVENTION

1. Field of the Invention

The present invention relates to a software evaluation method and a software evaluation system, and more particularly relates to software evaluation in a system including image forming devices, such as printers or multi function peripherals having a printer function, connected via a network.

2. Description of the Related Art

According to a conventional system, a personal computer or a similar image forming device can transmit various settings or requests to plural image forming devices connected via a network. For example, as discussed in Japanese Patent Application Laid-open No. 2000-132362, font data can be commonly registered to plural image forming devices. As a similar technique, one digital multi function peripheral can distribute an address book to other digital multi function peripherals.

One practical example of the system including plural image forming devices connected via a network is a system including plural printers or multi function peripherals having a scanner function, a facsimile function, and a copy function connected via a LAN. This system can realize a centralized control with respect to the settings for numerous image forming devices connected to a LAN.

For example, one personal computer (hereinafter, simply referred to as "PC"), one printer, or one multi function peripheral can be used as a management controller controlling other numerous image forming devices. When a user inputs predetermined settings on the management controller, the settings can be automatically distributed to other image forming devices connected via the LAN.

In another example, common settings, such as "when two consecutive originals have blank backs, copy them as one sheet printed at both front and back sides", may be required in an office. In this case, a user can instruct the settings on one PC or one multi function peripheral, while the system automatically distributes the instructed settings to other multi function peripherals. In other words, the user need not manually operate all of the multi function peripherals to accomplish the common settings for the copy function.

Furthermore, the charge management using a department ID may be employed to administrate the number of printed sheets. In this case, a user can input a department ID on one printer or one multi function peripheral, while the system automatically distributes the department ID to other multi function peripherals. In other words, the user need not manually operate all of the multi function peripherals to accomplish the settings required for the charge management.

In the development of communication software required in the above-described useful system, an evaluation test is often carried out to confirm and assure various functions of the software. In particular, a reliable evaluation test is required for a system including numerous printers or multi function peripherals because communication errors tend to arise in such a large-scale system. The communication software evaluation, for example, includes sequential tests such as, operational confirmation and debugging, for a "distribution function" set by the software of a transmitter and a "reception function" set by the software of a receiver. One of conventional evaluation methods uses real printers or real multi function peripherals, or uses hardware devices dedicated as simulators of these devices.

However, the evaluation method requiring real printers increases the cost. In particular, the evaluation for a large scale network environment requires a large number of real printers. For example, to evaluate the communication function of "distributing the information to 20 printers each receiving the information", the same number (i.e., 20) of real printers are required for the operational confirmation and debugging. This means that a system manufacturer must prepare 20 real printers and accordingly the entire manufacturing cost will increase. The burden and cost of the manufacturer increase as the number of printers connected to a network increases.

On the other hand, there is an evaluation method preparing a limited number of test printers smaller in total number than objects to be tested, e.g., using several or several tens printers or multi function peripherals, and evaluating the functions based on quantitative data obtained in this network environment. More specifically, theoretical values can be calculated based on a predetermined formula based on the quantitative data and the evaluation can be made based on the theoretical values.

However, the above-described evaluation method is effective only when the prepared network environment and the used formula are proper. For example, this evaluation method cannot be used in a system whose customers can actually operate the devices via a network, instead of using the theoretical values. Furthermore, when the total number of printers connected to a network increases up to a higher level (e.g., several hundreds or several thousands of printers or multi function peripherals are used), the number of real printers calculating the theoretical values must be increased to assure properness of the theoretical values. In this manner, the method using theoretical values may also encounter with the problem occurring when the number of actually operating printers increases.

Moreover, in Japanese Patent Application Laid-open No. 2003-46569, a method is provided for testing whether the software (for example, internet server software) can endure concentrated accesses from plural client PCs. More specifically, instead of using plural real client PCs, the test method uses only one PC that can virtually create plural client PCs to simulate concentrated accesses from the virtual client PCs to the server software. However, according to the method disclosed in Japanese Patent Application Laid-open No. 2003-46569, although plural virtual clients can operate on one PC, address setting for an access via a network is performed by another test module. More specifically, individual virtual clients have no independent communication functions as independent devices.

In some cases, printers or multi function peripherals can be plural receivers in a test evaluating the communication function, as described previously, wherein the communication result is evaluated for each of these devices. In this case, the arrangement using one PC for operating plural virtual software (for example, as suggested in Japanese Patent Application Laid-open No. 2003-46569) cannot be used. In other words, to execute the evaluation in the conditions identical with the real receiving devices, the virtual software itself must have the capability of recognizing and accepting an address or transmission from a client.

SUMMARY OF THE INVENTION

According to a first exemplary embodiment of the present invention, a software evaluation method is provided which includes a controlling step of controlling, via a network, plural virtual device software, allocated to different addresses and operating on an information processing apparatus, to execute predetermined processing; and a managing step of managing a processing result of the predetermined processing executed by the virtual device software in accordance with the controlling step.

According to another aspect of the aforementioned embodiment, the software evaluation method may further include a setting controlling step of controlling the information processing apparatus to execute setting for the plural virtual device software. Moreover, the software evaluation method may further include a step of intercepting contents of communications via the network and displaying or storing the intercepted communication contents.

According to another aspect of the aforementioned embodiment, the software evaluation method may further include the steps of intercepting contents of communications via the network; determining success or failure of each communication of the plural virtual device software based on the intercepted communication contents; transmitting the determination result to the information processing apparatus that controls a simulation of communications via the network; and displaying or storing the result in the information processing apparatus.

While, according to another aspect of the aforementioned embodiment, the software evaluation method may further include the steps of, operating data transfer software on the information processing apparatus; intercepting contents of communications via the network by the data transfer software; determining whether the intercepted communication contents require rewriting for a simulation of communications; and rewriting the communication contents when the rewriting is necessary.

Still yet, according to another aspect of the aforementioned embodiment, the software evaluation method may further include the steps of, operating web service server software on the information processing apparatus; intercepting contents of communications via the network by the web service server software; determining whether the intercepted communication contents require rewriting for a simulation of communications; and rewriting the communication contents when the rewriting is necessary. Also, the web service server software may be a UDDI server.

According to another exemplary embodiment of the present invention, a software evaluation method is provided which includes the steps of instructing to set receiver software of an image forming device to an information processing apparatus connected via a network, wherein the receiver software receives transmitting data by an external apparatus; and acquiring a reply which is responded by the receiver software in accordance with reception of the transmitting data.

According to another aspect of the aforementioned embodiment, the plural receiver software may be set to one information processing apparatus, and the plural receiver software are bound to different IP addresses to receive the data transmitted from the external apparatus.

According to yet another aspect of the aforementioned embodiment, the software evaluation method may further include the steps of determining, when the plural receiver software receive the data from the external apparatus, whether the processing corresponding to the received data is preset processing; and rewriting contents of the received data with an IP address relating to the reception when the processing corresponding to the received data is the preset processing, wherein plural receiver software are set to one information processing apparatus.

Additionally, according to yet another aspect of the aforementioned embodiment, the software evaluation method may further include the steps of determining, when the plural receiver software receive the data from the external apparatus, whether the processing corresponding to the received data is preset processing; and rewriting contents of reply data with an IP address relating to the reception when the processing corresponding to the received data is the preset processing, wherein plural receiver software are set to one information processing apparatus.

Moreover, according to yet another aspect of the aforementioned embodiment, the software evaluation method may further include the steps of determining, when the plural receiver software receive the data from the external apparatus, whether the processing corresponding to the received data is preset processing; and changing a sending destination of reply data with an IP address relating to the reception when the processing corresponding to the received data is the preset processing, wherein plural receiver software are set to one information processing apparatus.

Furthermore, according to yet another aspect of the aforementioned embodiment, the software evaluation method may further include the steps of binding web service server software operating on the information processing apparatus to all IP addresses allocated to a network interface corresponding to the plural receiver software; receiving data transmitted from the external apparatus; and transferring the data transmitted from the external apparatus to the receiver software corresponding to the received data, wherein plural receiver software are set to one information processing apparatus.

Still further, according to another aspect of the aforementioned embodiment, the software evaluation method further includes the step of setting a total number of plural receiver software operating on one information processing apparatus. In another aspect, the step of acquiring the reply of the receiver software obtains data transmitted to the plural receiver software, a hash value of the transmitted data, or a checksum of transmitted predetermined data.

And, according to another aspect of the aforementioned embodiment, the software evaluation method further includes the steps of determining, when the web service server software operating on the information processing apparatus receives the data from the external apparatus, whether the processing corresponding to the received data is preset web service; and rewriting an object element of the web service with an IP address relating to the reception when the processing corresponding to the received data is the preset web service, wherein plural receiver software are set to one information processing apparatus.

Still yet, according to another exemplary embodiment of the present invention, a software evaluation system is provided comprising a controlling unit configured to control, via a network, plural virtual device software, allocated to different addresses and operating on an information processing apparatus, to execute predetermined processing; and a managing unit configured to manage a processing result of the predetermined processing executed by the virtual device software in accordance with the controlling by the controlling unit.

And moreover, according to another exemplary embodiment of the present invention, a software evaluation system is provided comprising an instructing unit configured to instruct to set receiver software of an image forming device ported to an information processing apparatus connected via a network, wherein the receiver software receives transmitting data by an external apparatus; and an acquiring unit configured to acquire a reply responded by the receiver software according to reception of the transmitting data.

Furthermore, according to another exemplary embodiment of the present invention, a software evaluation program of instructions executable by a computer to perform the function of a controlling module configured to control, via a network, plural virtual device software, allocated to different addresses and operating on an information processing apparatus, to execute predetermined processing; and a managing module configured to manage a processing result of the predetermined processing executed by the virtual device software in accordance with the controlling by the controlling module.

Additionally, according to another exemplary embodiment of the present invention, a software evaluation program of instructions executable by a computer is provided which is adapted to perform the functions of an instructing module configured to instruct to set receiver software of an image forming device ported to an information processing apparatus connected via a network, wherein the receiver software receives transmitting data by an external apparatus; and an acquiring module configured to acquire a reply responded by the receiver software according to reception of the transmitting data.

Further, according to another exemplary embodiment of the present invention, a storage medium readable by a computer is provided, wherein the storage medium is adapted to store a program of instructions executable by the computer to perform the function of a controlling module configured to control, via a network, plural virtual device software, allocated to different addresses and operating on an information processing apparatus, to execute predetermined processing; and a managing module configured to manage a processing result of the predetermined processing executed by the virtual device software in accordance with the controlling by the controlling unit.

And finally, according to another exemplary embodiment of the present invention, a storage medium readable by a computer is provided, wherein the storage medium is adapted to store a program of instructions executable by the computer to perform the functions of an instructing module configured to instruct to set receiver software of an image forming device ported to an information processing apparatus connected via a network, wherein the receiver software receives transmitting data by an external apparatus; and an acquiring module configured to acquire a reply responded by the receiver software in accordance with reception of the transmitting data.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous exemplary embodiments, features and aspects of the present invention and, together with the description, serve to explain the principles of the invention.

FIG. 31 is a diagram showing an exemplary conversion table that lists port numbers of the transfer module to which the device information receiving section sends a reply in accordance with a tenth exemplary embodiment of the present invention.

DETAILED DESCRIPTION OF THE EXEMPLARY EMBODIMENTS

Figure 1:
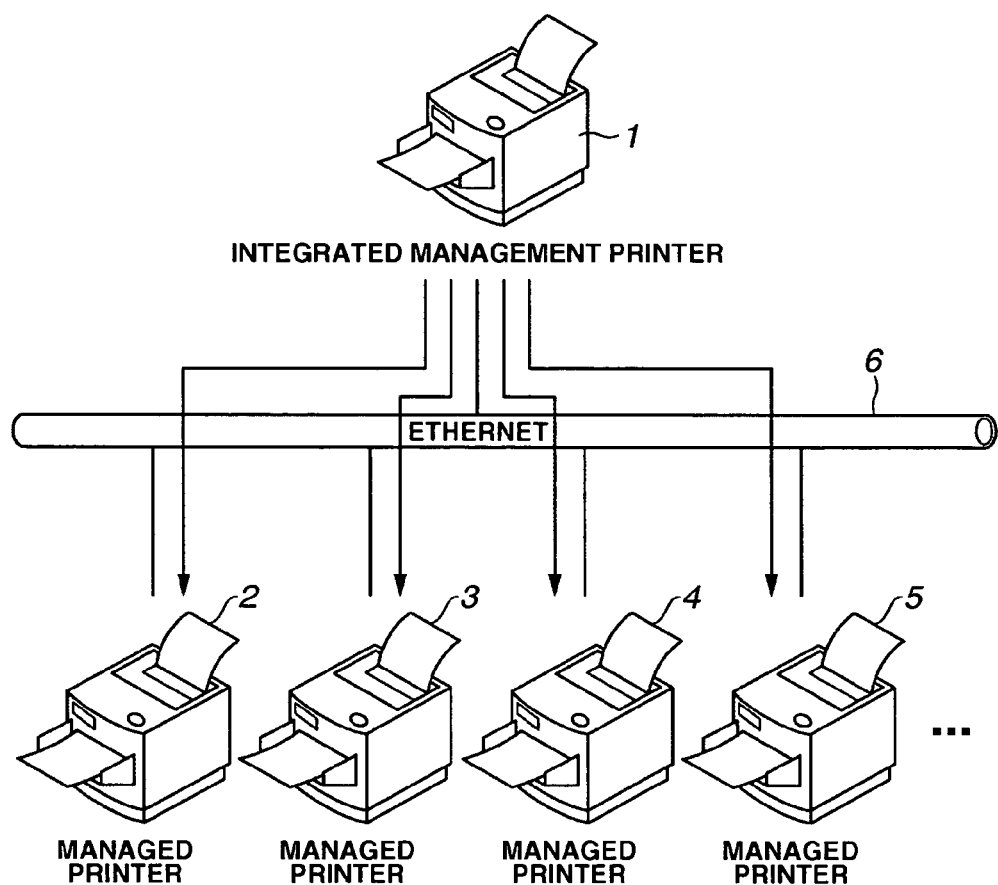
FIG. 1 is a schematic diagram showing an exemplary device information distribution system, as an object of a software evaluation system in accordance with the present invention.

The following description of the numerous exemplary embodiments is merely illustrative in nature and is in no way intended to limit the invention, its application, or uses. It is noted that the exemplary embodiments can be incorporated into various imaging devices (e.g., electronic cameras, camcorders, digital still cameras, film cameras, broadcast cameras, other imaging devices as known by one of ordinary skill, and equivalents) forming imaging systems.

Additionally the exemplary embodiments are not limited to visual imaging devices (e.g., optical photographic systems), for example the system can be designed for use with infrared and other wavelength imaging systems or any apparatus of device using flexible printed boards. Moreover, exemplary embodiments can be used with non-digital systems as well as digital systems (e.g., photographic systems using CCDs).

It is noted that throughout the specification, similar reference numerals and letters refer to similar items in the following figures, and thus once an item is defined in one figure, it may not be discussed or further defined in the following figures.

Exemplary embodiments of the invention will be described in detail below with reference to the drawings. It should be noted that the relative arrangement of the components, the numerical expressions and numerical values set forth in these exemplary embodiments do not limit the scope of the present invention unless it is specifically stated otherwise.

First, a device information distribution system will be described, as an object of a software evaluation system in accordance with each exemplary embodiment of the present invention. FIG. 1 shows one example of the device information distribution system. As shown in FIG. 1, the device information distribution system, as a network system, includes an integrated management printer 1 and four managed printers 2 to 5 connected via an Ethernet (registered trademark) 6.

When a user configures the integrated management printer 1 to newly create or change the settings of, for example, an address book of the printer, the printer 1 can validate the instructed settings or changes. In addition, the printer 1 has the capability of distributing device information. When a user instructs the printer 1 to distribute the settings, the printer 1 can distribute the settings (i.e., integrated management device information) to the managed printers 2 to 5 each having a function of receiving the distributed information. In other words, when a user instructs the settings to the integrated management printer 1, the same settings can be automatically set in respective managed printers 2 to 5. In this manner, the present system enables a user to remote control plural printers.

In the above-described example, the device information distribution system includes an "integrated management printer" having a transmission function and plural "managed printers" each having a reception function. However, the device information distribution system can include a printer having both a "transmission function" and a "reception function" of the settings. For example, the printers 1 to 5 can possess both a "transmission function" and a "reception function", as a "device information distribution function", and can be mutually connected via the Ethernet (registered trademark) 6. In this case, the printer 1 can act as an integrated management printer, and the printers 2 to 5 can act as managed printers.

Furthermore, according to the above-described example, plural printers constitute the device information distribution system including the transmitter side (i.e., integrated management printer). However, other image forming devices, such as multi function peripherals having both a printer function and a copy function, can constitute a device information distribution system of the present system.

In this case, as shown in each exemplary embodiment of the present invention with reference to the drawings, the software evaluation according to the present invention can be realized without using real image forming devices. From the foregoing description, it is apparent that the present invention can be effectively applied to a device information distribution system including relatively expensive image forming devices such as electrophotographic printers or multi function peripherals.

For example, in a large scale network system in which a management printer distributes device information to several hundreds of managed printers, the evaluation cost can be greatly reduced because it is unnecessary to actually use relatively expensive image forming devices. Needless to say, the software evaluation according to the present invention can be applied to a system including relatively non-expensive image forming devices, such as ink jet printers.

First Exemplary Embodiment

Figure 2:
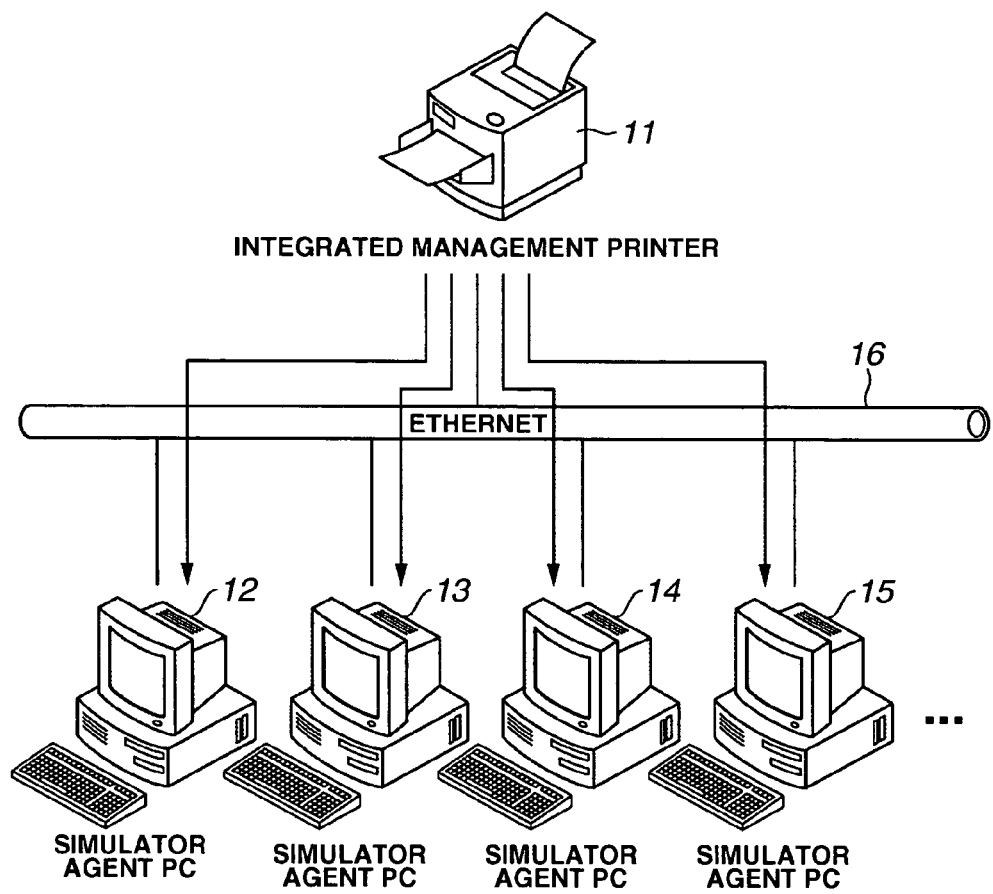
FIG. 2 is a schematic diagram showing a software evaluation system in accordance with a first exemplary embodiment of the present invention.

FIG. 2 shows the arrangement of a software evaluation system in accordance with a first exemplary embodiment of the present invention. As shown in FIG. 2, the software evaluation system of the first exemplary embodiment includes plural simulator agent personal computers (hereinafter, simply referred to as "simulator agent PC") 12 to 15 acting as the managed printers 2 to 5 of the evaluation object system shown in FIG. 1.

More specifically, the evaluation system of the first exemplary embodiment can be configured when the source codes complying with an interface definition, such as API (application program interface), are delivered and installed on the simulator agent PCs 12 to 15, so as to build the software capable of receiving device information of respective managed printers 2 to 5. More specifically, the reception software of respective managed printers can be ported to the simulator agent PCs 12 to 15 so that the reception software can operate on the simulator agent PCs. Details of the software will be described in detail in a later-described second exemplary embodiment.

In the above-descried evaluation system, to test the function of distributing device information from the integrated management printer 11 to four managed printers, a user of the integrated management printer 11 can change the settings of the printer 11. Then, the user can instruct the printer 11 to distribute the changed settings. In response to the user's instruction, the integrated management printer 11 can distribute, for example, an address book to respective simulator agent PCs 12 to 15 that are functionally equivalent to the managed printers 2 to 5.

In this case, the simulator agent PCs 12 to 15 can communicate with the integrated management printer 11 in the same manner as the managed printers 2 to 5, with respect to reception of the settings and reply of the result to the integrated management printer 11. According to the present exemplary embodiment, to enable a user to evaluate the communications, a predetermined display section of the integrated management printer 11 can display the result of communications performed between the printer 11 and respective managed printers.

For example, an exemplary display such as "end of transmission" indicates success in the communications and another display such as "transmission error" indicates failure in the communications. Needless to say, the display of "end of transmission" or "transmission error" is performed based on a predetermined rely returned from the reception software of each managed printer.

As described above, the software evaluation method of the present exemplary embodiment is based on the virtual device software using virtual devices (e.g., virtual printers) that can operate on a PC or an information processing apparatus connected to a network. Furthermore, the above-described evaluation method includes the controlling steps of executing the predetermined processing, such as a step of receiving distributed settings via the network and a step of returning a reply responding to the reception.

The evaluation method of the present exemplary embodiment can realize a test using general-purpose information devices instead of using managed printers, because of the device information distribution function of the integrated management printer 11. When the evaluation method of the present exemplary embodiment is applied to a network system including relatively expensive multi function peripherals or image forming devices, the cost required for the communication software evaluation test can be reduced.

In the present exemplary embodiment, the PC acting as a general-purpose information device can virtually realize the reception function of a managed printer. However, the PC can be replaced with a PDA, a portable telephone, or a server. The same thing can be applied to the systems described in the following exemplary embodiments. Furthermore, distribution of the settings is not limited to an address book and therefore any other type of settings can be distributed from the integrated management printer.

For example, as described previously, font data can be distributed from the integrated management printer to the managed printers in the process of downloading the font data. Namely, the integrated management printer can communicate with the reception software of each managed printer via the network. The reception software can execute predetermined processing to return a reply to the integrated management printer. The same thing can be applied to the systems of the following exemplary embodiments.

Figure 3:
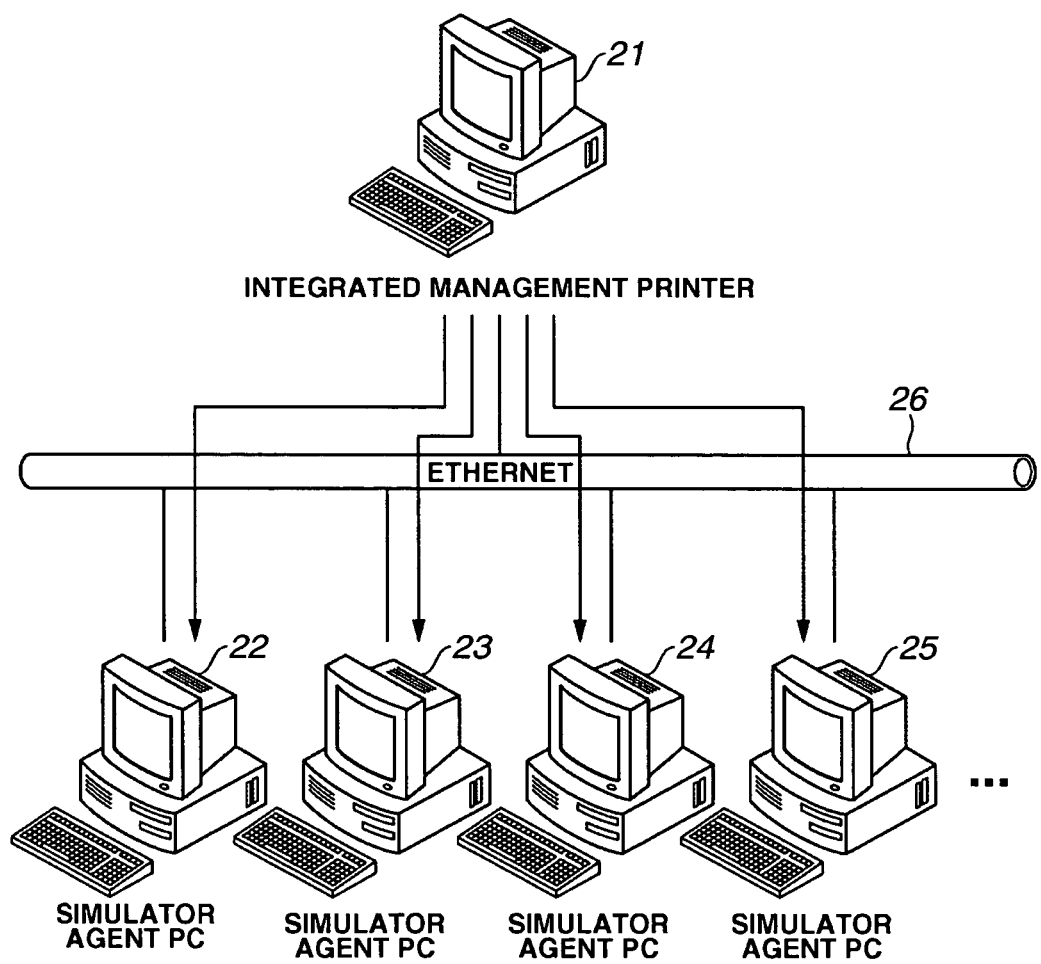
FIG. 3 is a schematic diagram showing another software evaluation system in accordance with the first exemplary embodiment of the present invention.

Furthermore, as a characteristic feature of the present exemplary embodiment, the general-purpose information devices can be used as receivers of device information instead of using printers or other image forming devices. In other words, the distributor of the present exemplary embodiment is not limited to a printer and accordingly, as shown in FIG. 3, the integrated management printer (i.e., the distributor) can be replaced with an integrated managing PC.

Second Exemplary Embodiment

The second exemplary embodiment of the present invention provides a PC capable of virtually realizing reception functions of plural managed printers. According to the above-descried first exemplary embodiment, one PC can function as one managed printer. The number of required PCs is identical with the number of required distribution destinations. Therefore, the number of required PCs increases with increasing number of required distribution destinations. In the second exemplary embodiment, one simulator agent PC can possess functions equivalent to plural managed printers, to reduce the number of PCs and the cost required in the simulation.

Figure 4:
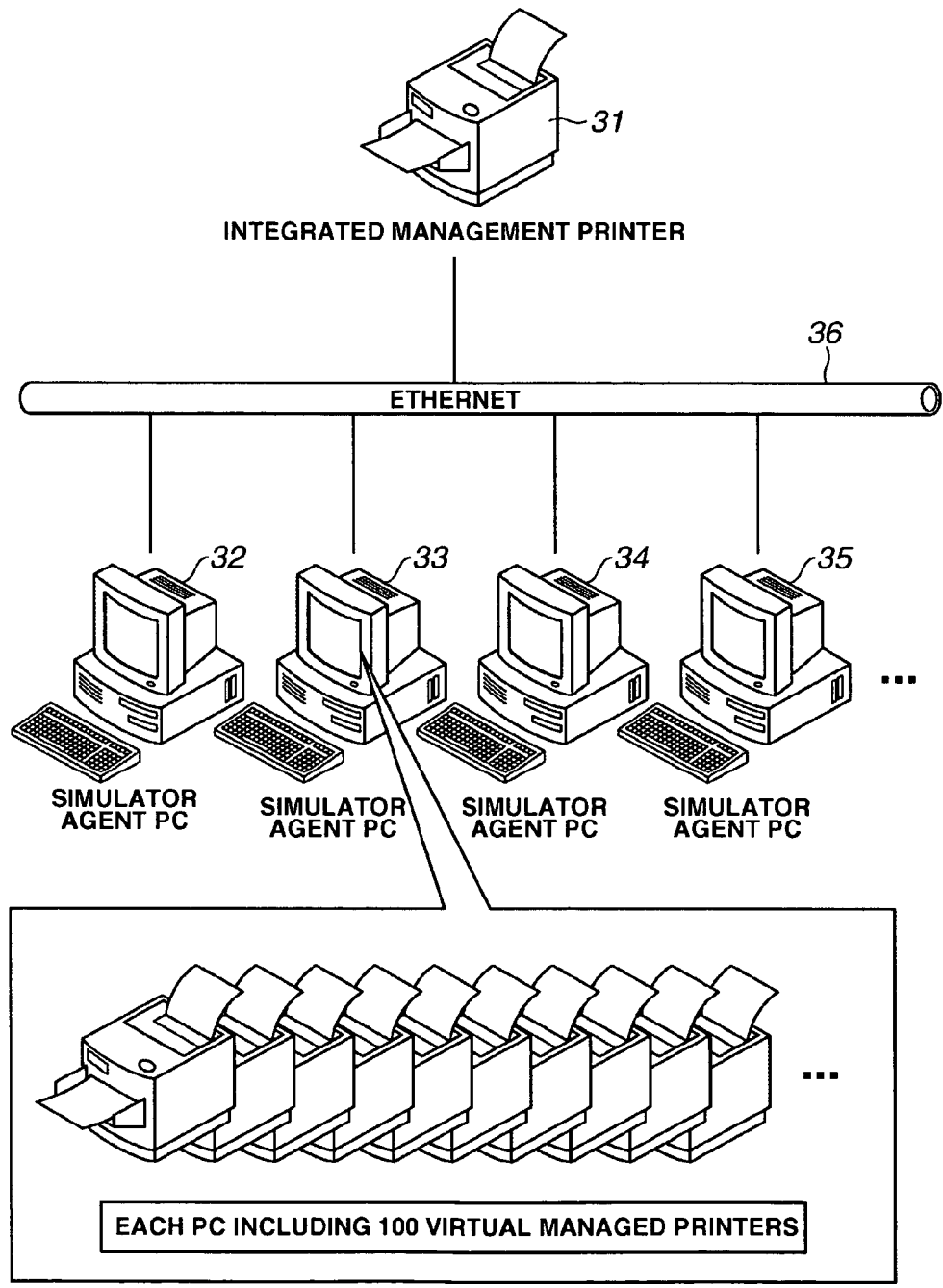
FIG. 4 is a schematic diagram showing a software evaluation system in accordance with a second exemplary embodiment of the present invention.

FIG. 4 shows the arrangement of an evaluation system in accordance with the second exemplary embodiment, in which one simulator agent PC can possess functions equivalent to plural managed printers. The evaluation system of FIG. 4, as a network system, includes an integrated management printer 31 and plural simulator agents PC 32 to 35 connected via an Ethernet (registered trademark) 36. Each of the simulation agents PC 32 to 35 can operate reception software of a total of 100 managed printers.

Figure 5:
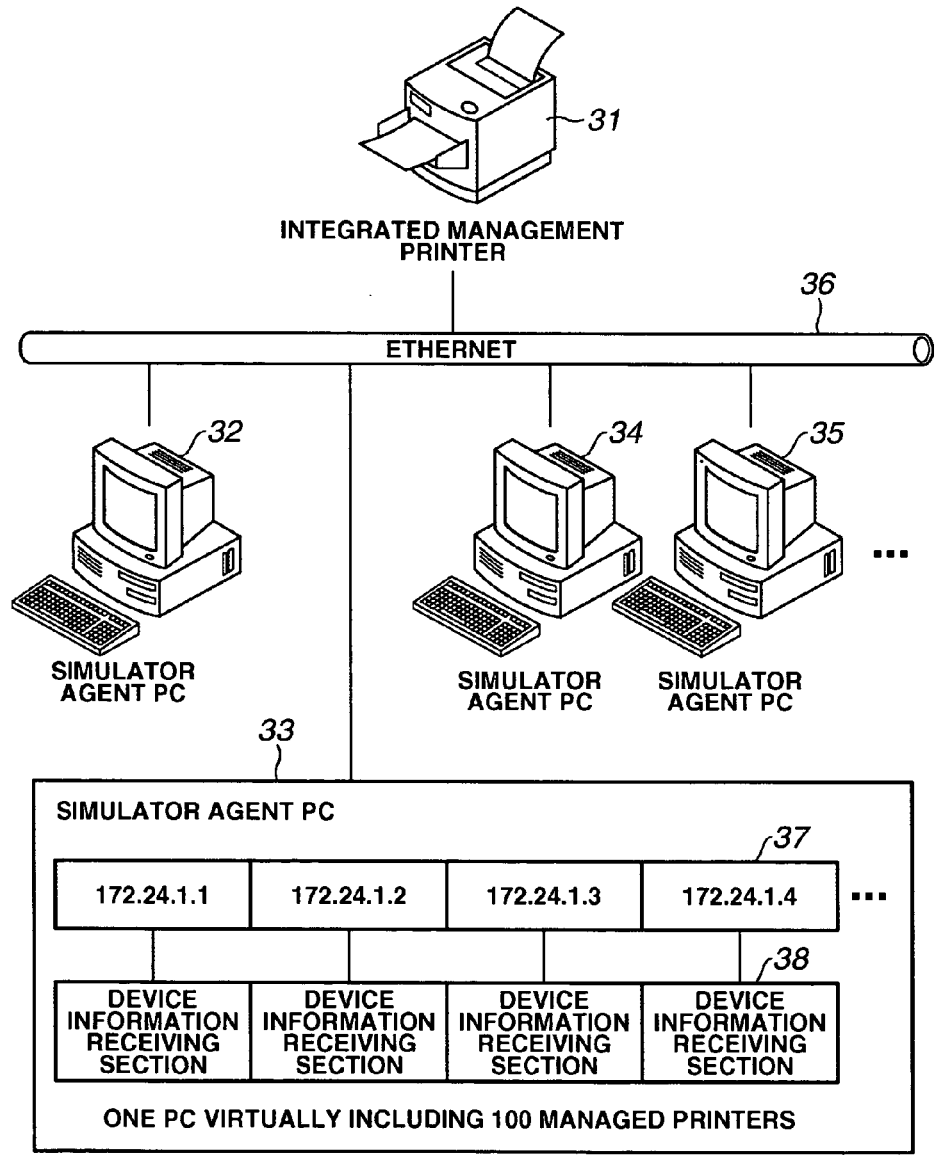
FIG. 5 is a schematic diagram showing the internal arrangement of a simulator agent PC 33 shown in FIG. 4.

FIG. 5 shows the internal arrangement of the simulator agent PC 33 shown in FIG. 4. The simulator agent PC 33 includes a network transport layer 37 acting as an interface that controls communications between the network and the simulator agent PC 33 and a device information receiving section 38 that receives the distributed settings via the network. The device information receiving section 38 includes plural units each constituting the receiver software ported from one managed printer. According to the first exemplary embodiment shown in FIG. 2 or FIG. 3, one simulator agent PC has the receiver software comparable with one set of a net transport layer and a device information receiving section. Also, FIG. 5 shows only four of 100 simulator agent PCs. Each of plural device information receiving sections 38 constitutes one unit of the receiver software, and is bound to an IP address corresponding to its virtual managed printer.

The second exemplary embodiment describes a transmission/reception program of the evaluation system using a connection-type protocol such as TCP (transmission control protocol). More specifically, the receiver software consisting of the network transport layer 37 and the device information receiving section 38 can be configured by using a "socket" serving as a network API.

In general, the creation of the receiver program using the socket includes the steps of (1) "socket generation", (2)

"socket registration", (3) "preparation for socket connection", (4) "waiting for socket connection", (5) "reception/transmission", and (6) "socket disconnection". In the present exemplary embodiment, the device information receiving section 38 can execute the steps of (1) "socket generation" and (2) "socket registration". More specifically, the device information receiving section 38 can register an IP address in the step of "socket registration", to bind the device information receiving section 38 to the registered address. Furthermore, the device information receiving section 38 can execute the steps of (3) "socket connection preparation", (4) "waiting for socket connection", (5) "reception/transmission", and (6) "socket disconnection".

In this manner, the ported receiver software can execute the step of "waiting for socket connection" in the condition that the IP address is "socket" registered. More specifically, in the condition that the device information receiving section 38 is bound to the IP address, the device information receiving section 38 can wait the distributed settings delivered from the integrated management printer 31.

In particular, one PC of the present exemplary embodiment can virtually realize reception functions of plural printers. Each receiver software, bound to an IP address, can independently receive the settings distributed from the integrated management printer 31 and can execute required reply processing. Similar to the first exemplary embodiment, a predetermined display section of the integrated management printer 31 can display the result of communications.

As described above, the software evaluation method of the present exemplary embodiment differs from the evaluation method of the first exemplary embodiment in that the virtual device software is composed of plural virtual device software. The software evaluation method of the present exemplary embodiment can control each of plural virtual device software to execute the predetermined processing, such as a step of receiving distributed settings via a network and a step of returning a reply. Different IP addresses are allocated to plural device software.

According to the second exemplary embodiment, the simulator agent PC 33 is functionally equivalent to 100 managed printers. Similarly, each of the simulator agent PCs 32, 34, and 35 is functionally equivalent to 100 managed printers. For example, to execute a test for evaluating the communications in the distribution of device information from one integrated management printer distributes to 400 managed printers, the simulation of the present exemplary embodiment requires only 4 PCs instead of using 400 managed printers. As a result, the cost for the evaluation test can be reduced. In particular, in a case that the managed printers are multi function peripherals or other expensive image forming devices, the total cost can be greatly reduced.

In the operation of plural virtual device software, plural processes can be replaced with plural threads depending on a system configuration to be evaluated. Furthermore, the example of FIG. 5 schematically shows the network transport layer 37 using plural IP addresses. To practically realize this configuration, plural IP addresses can be allocated to one network interface card (referred to as NIC). Alternatively, it is possible to use plural NICs each having a single IP address. Furthermore, plural IP addresses can be allocated to each of plural NICs.

Third Exemplary Embodiment

According to the above-described second exemplary embodiment, the simulator agent PC 33 has plural device information receiving sections each bound to one IP address. However, in a case that the device information receiving section of the managed printer can use a web service technique, it is possible to use general-purpose web server software. The third exemplary embodiment provides a managed printer whose device information receiving section is configured by the software using the web service technique.

Figure 6:
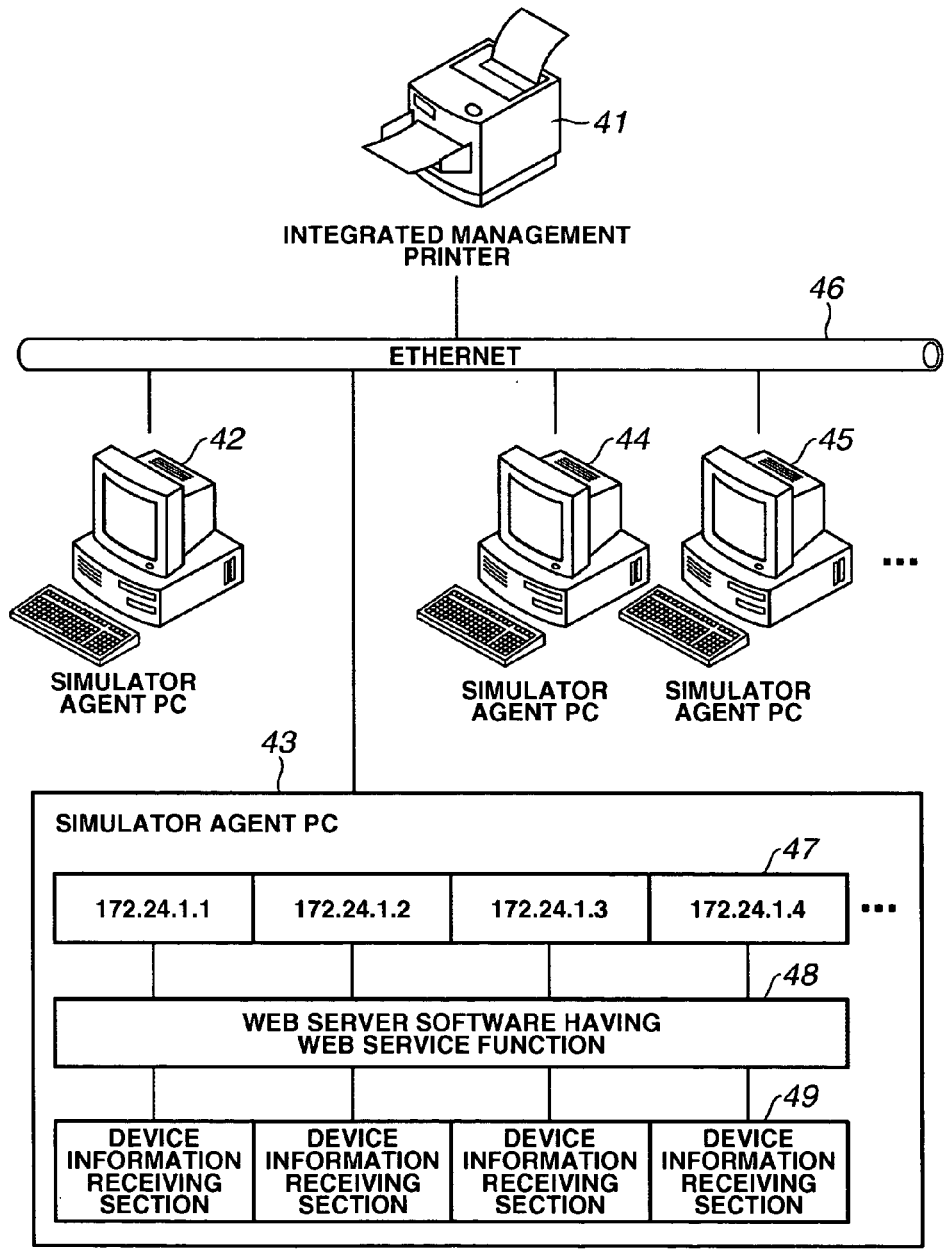
FIG. 6 is a schematic diagram showing a software evaluation system in accordance with a third exemplary embodiment of the present invention.

FIG. 6 shows the arrangement of a software evaluation system in accordance with the third exemplary embodiment of the present invention. The software evaluation system shown in FIG. 6 includes general-purpose web server software 48 having a web service function, such as a UDDI server, installed on the simulator agent PC 43. The web server software 48 can execute the common web service for plural device information receiving sections 49 corresponding to a hundred managed printers. Furthermore, the software evaluation system includes a transport layer 47 that can bind the web server software 48 to plural IP addresses corresponding to the device information receiving sections 49 of the hundred managed printers. The device information receiver software 49 of plural managed printers are respectively ported and installed, as web service, on the web server software 48. With this arrangement, respective device information receiving sections 49 are connected in parallel to each other and can operate individually.

More specifically, the web server software 48 can execute the steps of (1) "socket generation", (2) "socket registration", (3) "preparation for socket connection", and (4) "waiting for socket connection", according to the connection type protocol TCP. Moreover, in the step of "socket registration", the web server software 48 can bind IP addresses with ANY settings. According to the ANY settings, all IP addresses allocated to the NIC can be used.

Furthermore, the web server software 48 can execute the step of "waiting for socket connection" to wait the device information transmitted from an integrated management printer 41. When the web server software 48 receives the settings distributed from the integrated management printer 41, the web server software 48 delivers the received settings to a device information receiving section 49 corresponding to an IP address transmitted from the integrated management printer 41. Then, the web server software 48 returns to a standby condition. The device information receiving section 49 can execute the steps of (5) "reception/transmission" and (6) "socket disconnection" for the delivered settings.

According to the present exemplary embodiment, the general-purpose web server software can execute the bind processing of the IP address. Thus, it is unnecessary to change or modify the bind processing of the device information reception software itself. Furthermore, instead of porting the web server software portion having a web service function, only the receiving section of the device information installed as the web service can be ported. Accordingly, the process of porting the software of the device information receiving section does not require so much time and labor.

Fourth Exemplary Embodiment

According to the second and third exemplary embodiments, each simulator agent PC determines the total number of device information receiving sections corresponding to plural managed printers. However, according to these embodiments, setting operations may be required when the evaluation system uses a great number of simulator agent PCs. On the other hand, the present exemplary embodiment provides one PC capable of executing all of the required setting operations.

Figure 7:
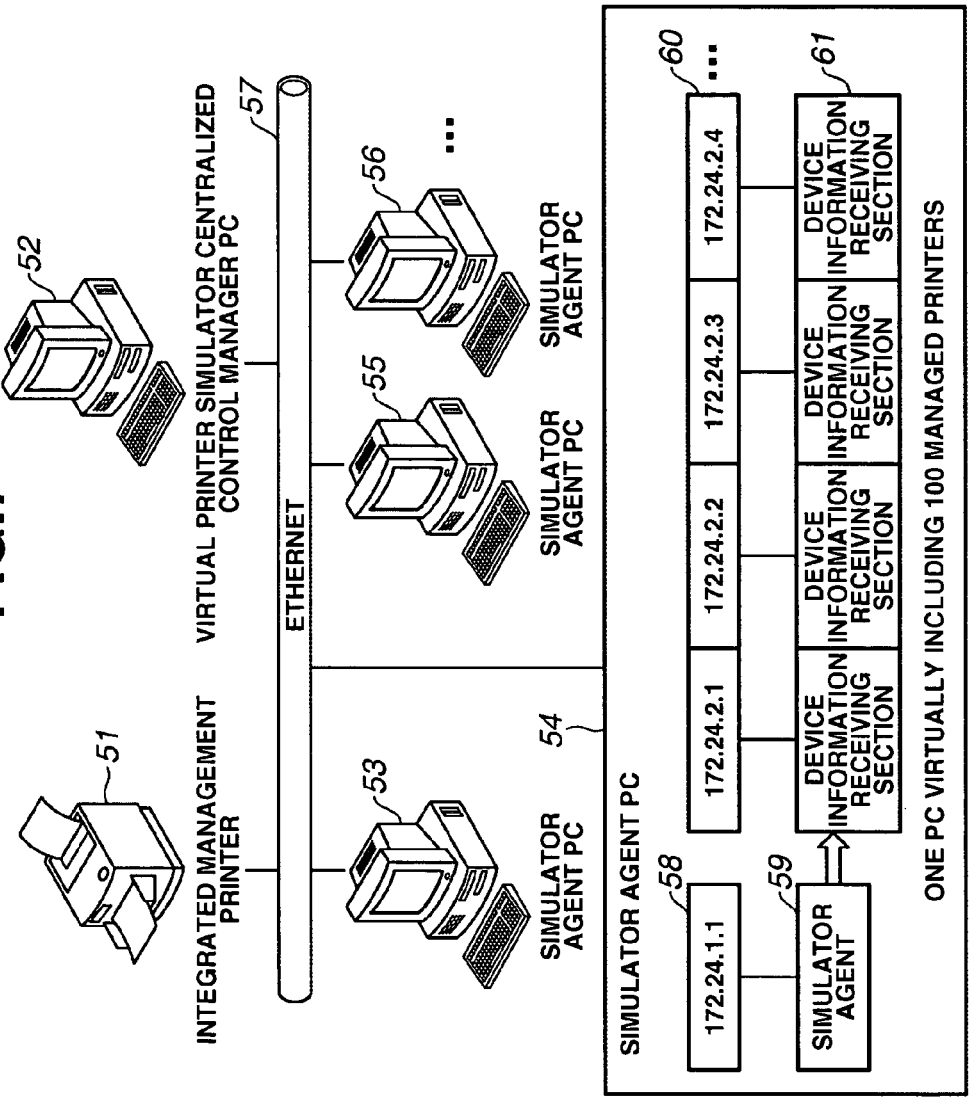
FIG. 7 is a schematic diagram showing a software evaluation system in accordance with a fourth exemplary embodiment of the present invention.

FIG. 7 shows the arrangement of a software evaluation system in accordance with the fourth exemplary embodiment of the present invention. Similar to the system of the second and third exemplary embodiments, the software evaluation system shown in FIG. 7 includes a virtual printer simulator centralized control manager PC 52 in addition to an integrated management printer 51 and plural simulator agent PCs 53 to 56 which are connected via an Ethernet (registered trademark) 57.

Furthermore, simulator agent software 59, integrally controlling plural device information receiving sections, is installed on each simulator agent PC. The simulator agent software 59 can communicate with the virtual printer simulator centralized control manager PC 52 with an IP address (58). Furthermore, virtual printer simulator centralized control manager software is installed on the virtual printer simulator centralized control manager PC 52. With this arrangement, the virtual printer simulator centralized control manager PC 52 can control the simulator agent software 59 to set a total number of the operating device information receiving sections (60 and 61).

Figure 8:
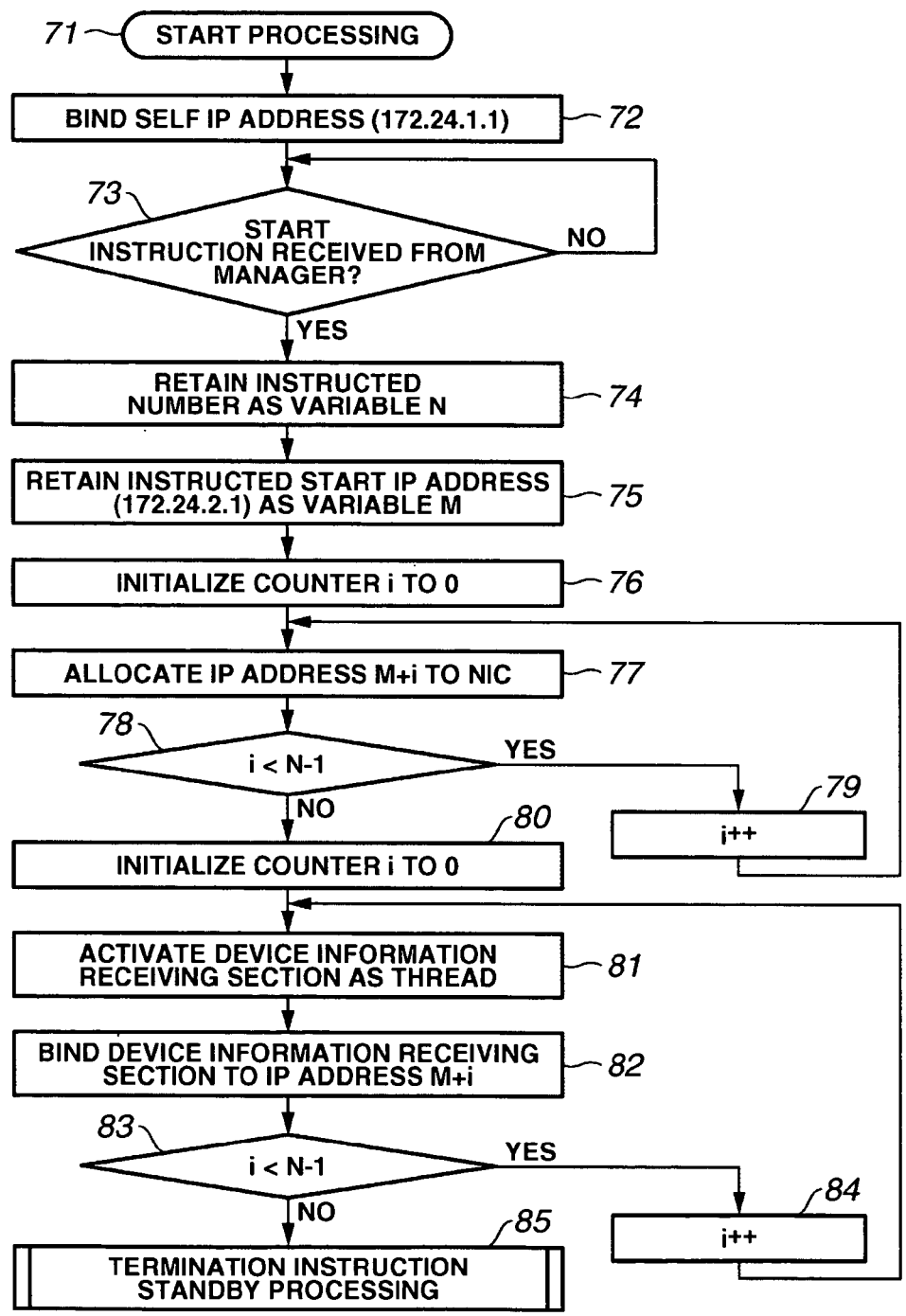
FIG. 8 is a flowchart showing exemplary simulation initiation processing, included in the processing of simulator agent software shown in FIG. 7.

FIG. 8 is a flowchart showing exemplary simulation initiation processing, included in the processing of the simulator agent software 59. After starting the simulation initiation processing (refer to step 71), the simulator agent software 59 binds a self IP address (refer to step 72) and waits for an instruction transmitted from the virtual printer simulator centralized control manager PC 52 (refer to step 73). It is noted that the sequential steps of binding an IP address and waiting an instruction can be executed by a program complying with the above-described protocol TCP.

In response to a start instruction transmitted from the virtual printer simulator centralized control manager PC 52, the simulator agent software 59 retains a setting number included in the instruction as a variable N (refer to step 74). Next, the simulator agent software 59 retains a start IP address included in the instruction (i.e., 172.24.2.1 according to the example shown in FIG. 7) as a variable M (refer to step 75). Then, the simulator agent software 59 initializes a counter i to zero (refer to step 76).

Then, the simulator agent software 59 allocates an IP address M+i to the NIC of the simulator agent PC (refer to step 77). Then, the simulator agent software 59 determines whether the counter i is less than N−1 (refer to step 78). When the counter i has not reached N−1 (i.e., YES in step 78), the simulator agent software 59 increments the counter i by one (refer to step 79). The simulator agent software 59 repeats the above-described processing until the counter i reaches N−1. In other words, through the above-described processing, the simulator agent software 59 can allocate a total of N IP addresses. It is noted that the allocation of IP addresses can be performed by allocating plural IP addresses to one NIC. When plural NICs are used, one IP address or plural IP addresses can be allocated to each NIC.

When the counter i reaches N−1 (i.e., NO in step 78), the simulator agent software 59 initializes the counter i to zero (refer to step 80). Next, the simulator agent software 59 activates the device information receiving section ported from the managed printer as a thread or a process (refer to step 81). Then, the simulator agent software 59 binds the activated device information receiving section to the IP address M+i (refer to step 82: "socket registration").

Then, the simulator agent software 59 determines whether counter i is less than N−1 (refer to step 83). When the counter i has not reached N−1 (i.e., YES in step 83), the simulator agent software 59 increments the counter i by one (refer to step 84). The simulator agent software 59 repeats the above-described processing until the counter i reaches N−1. In other words, through the above-described processing, the simulator agent software 59 can bind each of a total of N information receiving sections to a unique IP address.

When the counter i has reached N−1 (i.e., NO in step 83), the simulator agent software 59 waits for a termination instruction transmitted from the virtual printer simulator centralized control manager PC 52 (refer to step 85). When the simulator agent software of each simulator agent PC is in the standby condition, a test for distributing device information from the integrated management printer 51 to a total of N device information receiving sections can be started in the same manner as the above-described second and third exemplary embodiments.

Figure 9:
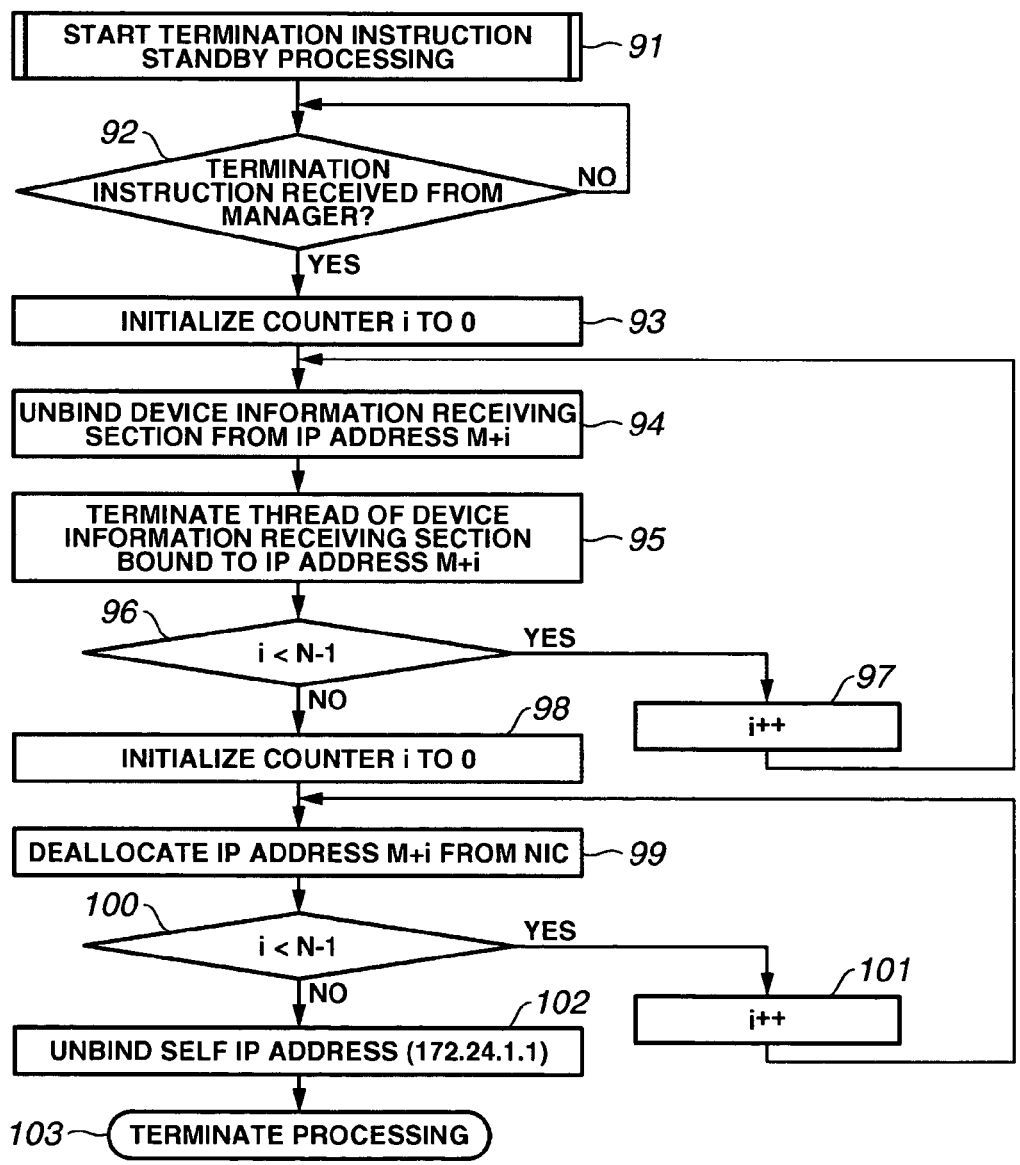
FIG. 9 is a flowchart showing simulation termination processing, included in the processing of simulator agent software shown in FIG. 7.

FIG. 9 is a flowchart showing exemplary simulation termination processing, included in the processing of the simulator agent software 59 in accordance with the present exemplary embodiment. At step 91, the termination instruction standby processing is initiated. The simulator agent software 59 determines whether a termination instruction is received from the virtual printer simulator centralized control manager PC 52 (refer to step 92). When the termination instruction is received (i.e., YES in step 92), the simulator agent software 59 initializes the counter i to zero (refer to step 93). Next, the simulator agent software 59 unbinds the device information receiving section from the IP address M+i (refer to step 94: "socket disconnection").

Then, the simulator agent software 59 terminates the thread or process of the device information receiving section bound to the IP address M+i (refer to step 95). Then, the simulator agent software 59 determines whether the counter i is less than N−1 (refer to step 96). When the counter i has not reached N−1 (i.e., YES in step 96), the simulator agent software 59 increments the counter i by one (refer to step 97). The simulator agent software 59 repeats the above-described processing until the counter i reaches N−1. In other words, through the above-described processing, the simulator agent software 59 can unbind a total of N IP addresses.

When the counter i has reached N−1 (i.e., NO in step 96), namely when the simulation termination processing is completed for all of the device information receiving sections, the simulator agent software 59 initializes the counter i to zero (refer to step 98). Next, the simulator agent software 59 deallocates the IP address M+i from the NIC (refer to step 99). Then, the simulator agent software 59 determines whether the counter i is less than N−1 (refer to step 100).

When the counter i has not reached N−1 (i.e., YES in step 100), the simulator agent software 59 increments the counter i by one (refer to step 101). The simulator agent software 59 repeats the above-described processing until the counter i reaches N−1. In other words, through the above-described processing, the simulator agent software 59 can deallocate all of the IP addresses. When the counter i has reached N−1 (i.e., NO in step 100), namely when the deallocation processing is completed for all of the IP addresses, the simulator agent software 59 unbinds the self IP address (refer to step 102) and terminates this routine (refer to step 103).

Figure 10:
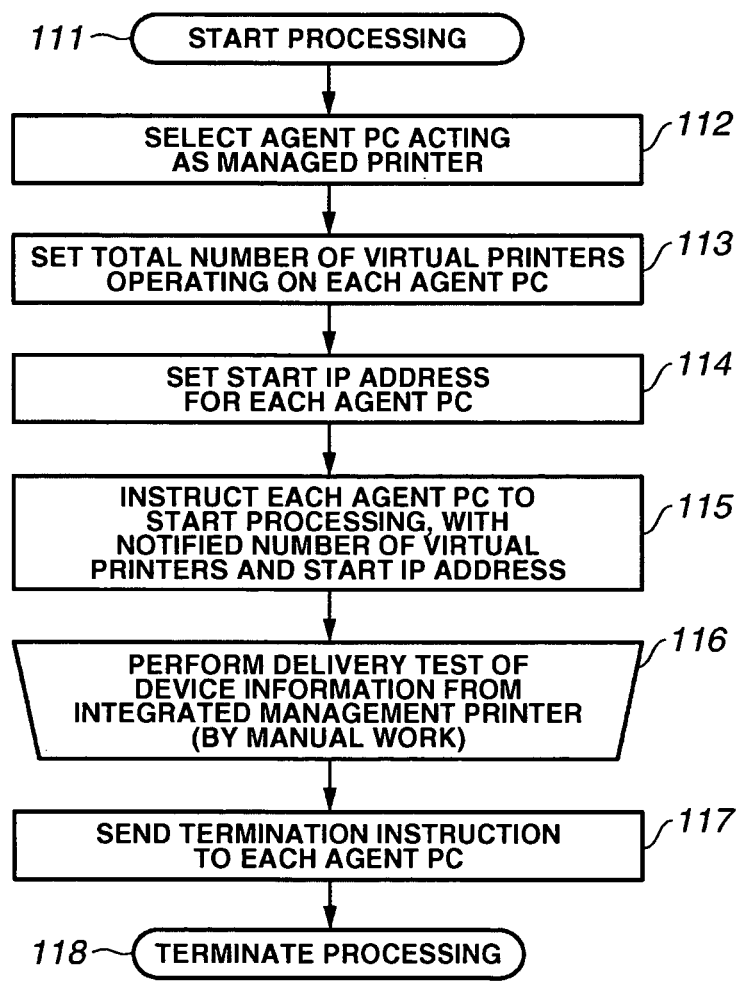
FIG. 10 is a flowchart showing the exemplary processing of virtual printer simulator centralized control manager software that controls the processing of the simulator agent software shown in FIGS. 8 and 9.

FIG. 10 is a flowchart showing exemplary processing of the control manager software, installed on the control virtual printer simulator centralized control manager PC 52 that can control the processing of the simulator agent software 59 described with reference to FIGS. 8 and 9.

When the processing is started (refer to step 111), the virtual printer simulator centralized control manager software allows a user to select one or more simulator agent PCs having device information receiving sections acting as managed printers (refer to step 112). Then, the virtual printer simulator centralized control manager software allows a user to set a total number of the device information receiving sections in each simulator agent PC (refer to step 113).

Furthermore, the virtual printer simulator centralized control manager software allows a user to set a start IP address used on each simulator agent PC (refer to step 114). In the above-described settings, a user can set only one start IP address for one simulator agent PC. In this case, the virtual printer simulator centralized control manager software can automatically set start IP addresses for other simulator agent PCs. Next, the virtual printer simulator centralized control manager software instructs the simulator agent software 59 operating on each simulator agent PC to start the processing (refer to step 115). This instruction includes information relating to the total number of required virtual printers (i.e., the total number of required device information receiving sections) and start IP addresses.

In the condition that issuance of the instructions are successfully completed, a user can manually test a distribution of device information (e.g., an address book) from the integrated management printer 51 to the device information receiving sections corresponding to plural virtual managed printers (refer to step 116). Similar to the above-described exemplary embodiments, to enable a user to evaluate the test, a predetermined display section of the integrated management printer 51 can display the result of success/failure in the distribution test.

After the test is finished, the virtual printer simulator centralized control manager software allows a user to input a termination instruction. In response to the user's termination instruction, the virtual printer simulator centralized control manager software instructs the simulator agent software 59 operating on each simulator agent PC to terminate the processing (refer to step 117). Next, the process is terminated at step 118. As described above, the software evaluation method of the present exemplary embodiment includes a step of enabling the information processing apparatus to control the settings of the virtual device software including the total number of the device information receiving sections.

In the present exemplary embodiment, the device information receiving section ported from the managed printer is installed beforehand in the simulator agent PC. However, the virtual printer simulator centralized control manager PC 52 can distribute, to the simulator agent PC, not only the start instruction (refer to step 115) but also the software of the device information receiving section ported from the managed printer.

Furthermore, the distribution test (refer to step 116) of the present exemplary embodiment is not limited to a user's manual work. For example, when a distributor is a PC as shown in FIG. 3 of the first exemplary embodiment, the PC can automatically start the test and display the communication result.

Additionally, in the present exemplary embodiment or in the above-described exemplary embodiments, each of the device information receiving sections corresponds to a printer. However, the device information receiving section is not limited to a single printer. For example, the simulator agent PCs 53 and 54 can receive device information equivalent to a particular type of printers, while the simulator agent PCs 55 and 56 can receive device information equivalent to another type of printers.

Furthermore, device information receiving sections corresponding to plural types of printers can operate on one simulator agent PC. For example, the start instruction transmitted to each simulator agent PC (refer to step 115) shown in FIG. 10 can include information designating the total number of device information receiving sections for a particular type and the number of device information receiving sections for another type.

According to the present exemplary embodiment, the total number of PCs required in the test can be reduced. Furthermore, automatically instructing the test preparation to each simulator can reduce the required time and labor of an operator.

Fifth Exemplary Embodiment

According to the above-described first, second, third, and fourth exemplary embodiments, individual device information receiving sections return a predetermined reply to the integrated management printer with respect to the distribution result and the integrated management printer displays the returned result. However, in the present exemplary embodiment, the simulator agent software 59 shown in FIG. 7 can provide a function of acquiring detailed distribution results and returning the results to the integrated management printer in addition to the function of instructing the initiation and termination of a test.

Figure 11:
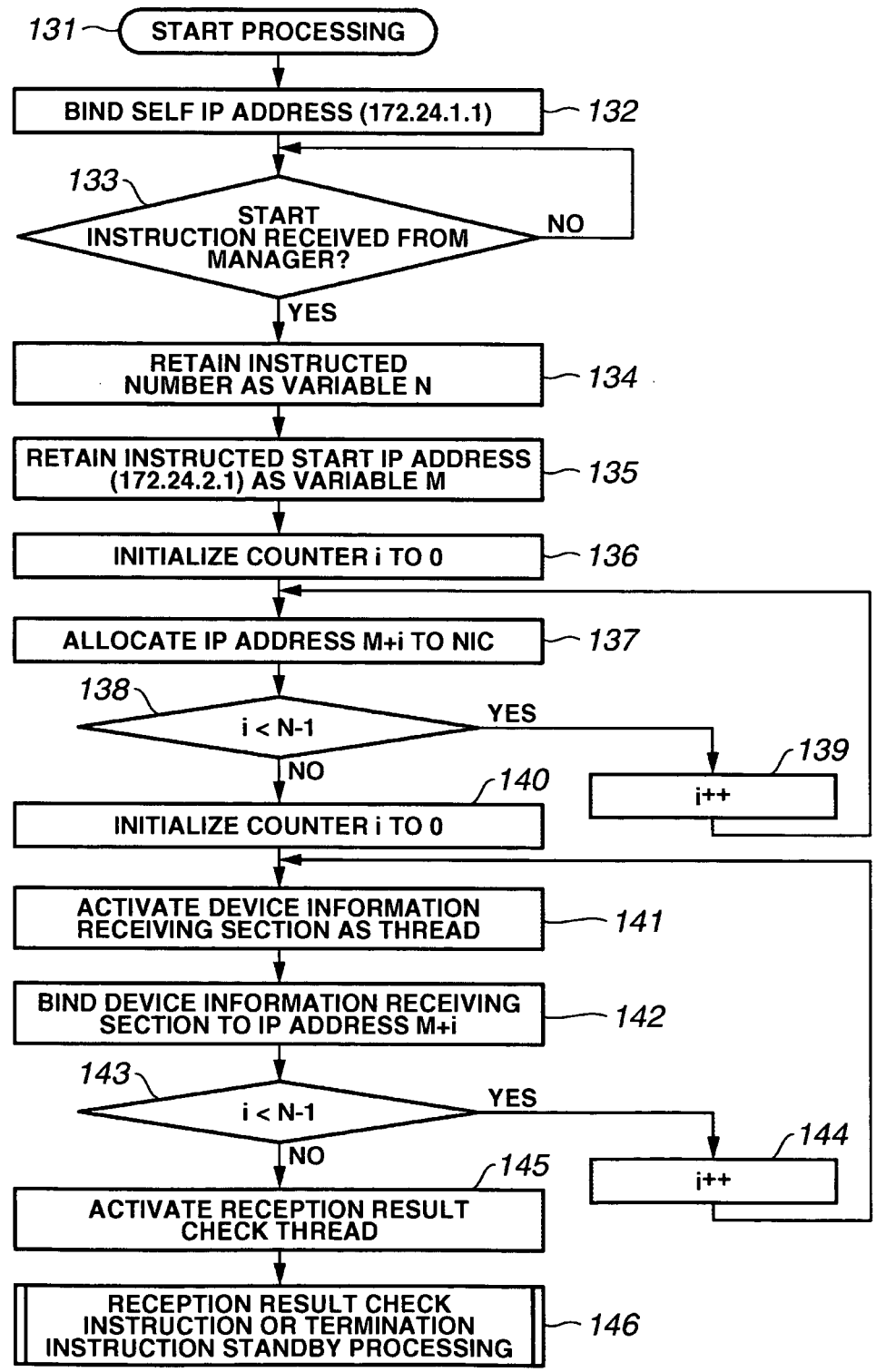
FIG. 11 is a flowchart showing simulation initiation processing, included in the processing of simulator agent software in accordance with a fifth exemplary embodiment of the present invention.

FIG. 11 is a flowchart showing exemplary simulation initiation processing, included in the processing of the simulator agent software 59, in accordance with the fifth exemplary embodiment of the present invention. The processing of steps 131 through 144 is similar with the processing of steps 71 through 84 shown in FIG. 8 and is accordingly not described below in detail.

The different point is that the simulator agent software 59 activates a reception result check thread after finishing the processing of activating the device information receiving sections and binding the IP addresses (refer to step 145). Then, the simulator agent software 59 waits for a reception result check instruction or a termination instruction transmitted from the virtual printer simulator centralized control manager PC 52 (refer to step 146).

The reception result check thread includes the processing for collecting distributed data from device information receiving sections. Furthermore, the reception result check thread includes the processing for returning the distribution data or its hash value, or checksum of the distributed data to the virtual printer simulator centralized control manager PC 52 (refer to FIG. 7).

Figure 12:
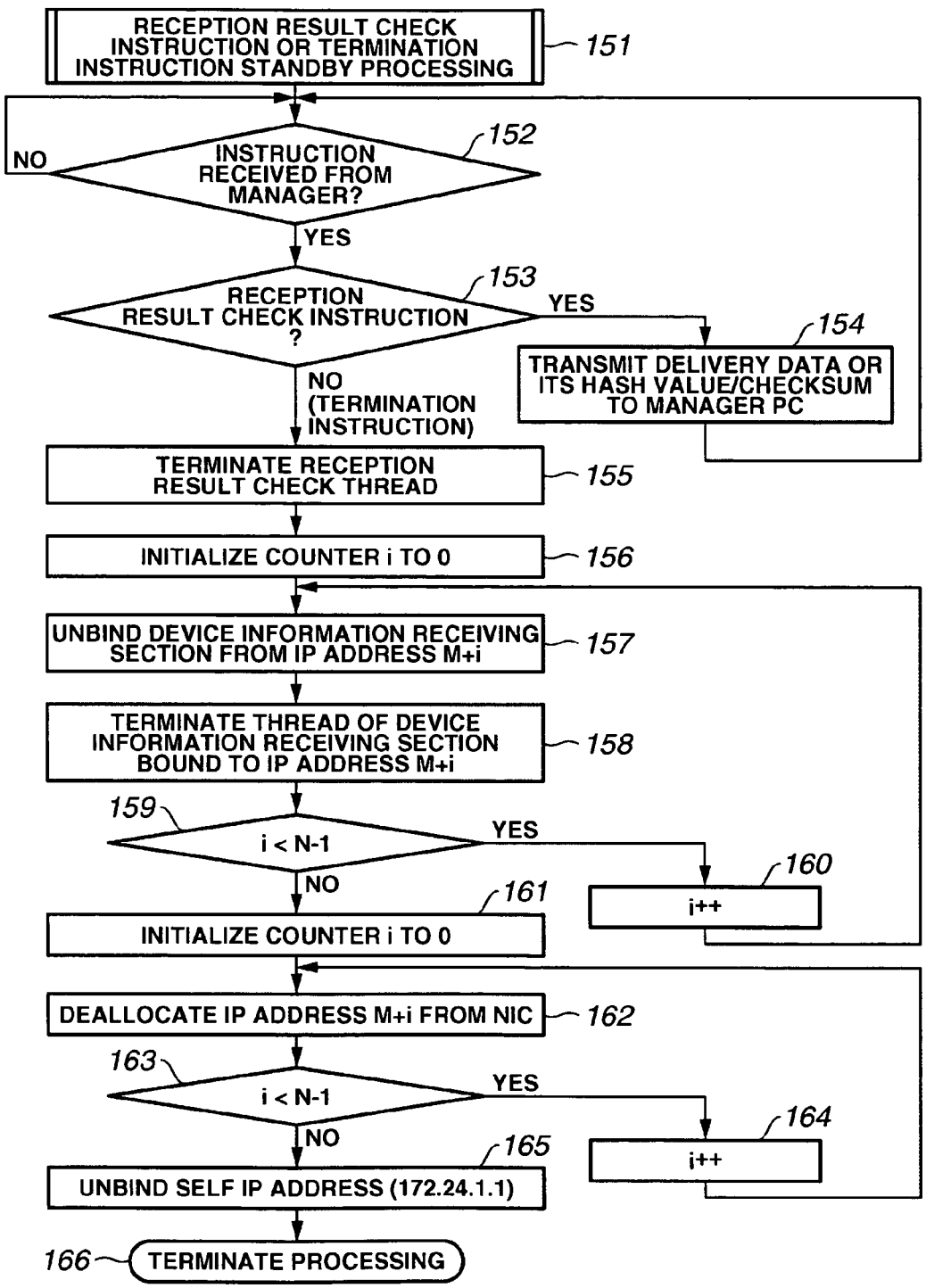
FIG. 12 is a flowchart showing simulation result check processing and simulation termination processing, included in the processing of simulator agent software in accordance with the fifth exemplary embodiment.

FIG. 12 is a flowchart showing exemplary simulation result check processing and simulation termination processing, included in the processing of the simulator agent software 59 of the present exemplary embodiment. First, reception result check instruction or termination instruction standby processing is initiated at step 151. The simulator agent software 59 determines whether a reception result check instruction or a termination instruction is transmitted from the virtual printer simulator centralized control manager PC 52 (refer to step 152).

When any instruction is received (i.e., YES in step 152), the simulator agent software 59 determines whether the reception result check instruction is received (refer to step 153). When the reception result check instruction is received (i.e., YES in step 153), the simulator agent software 59 collects the reception data from respective device information receiving threads that receive device information from the integrated management printer 51, by using the reception result check thread activated in the step 145 of FIG. 11.

Then, the simulator agent software 59 sends the reception data or its hash value, or checksum to the virtual printer simulator centralized control manager PC 52 (refer to step 154). In this case, the simulator agent software 59 can determine the data included in a reply from the reception data, its hash value, or checksum considering the system specifications of an object to be evaluated or evaluation accuracy.

When the received instruction is a termination instruction (i.e., NO in step 153), the simulator agent software 59 completes the reception result check thread (refer to step 155). The processing of succeeding steps 156 through 166 is similar with the processing of steps 93 through 103 shown in FIG. 9 and is accordingly not described below in detail.

Figure 13:
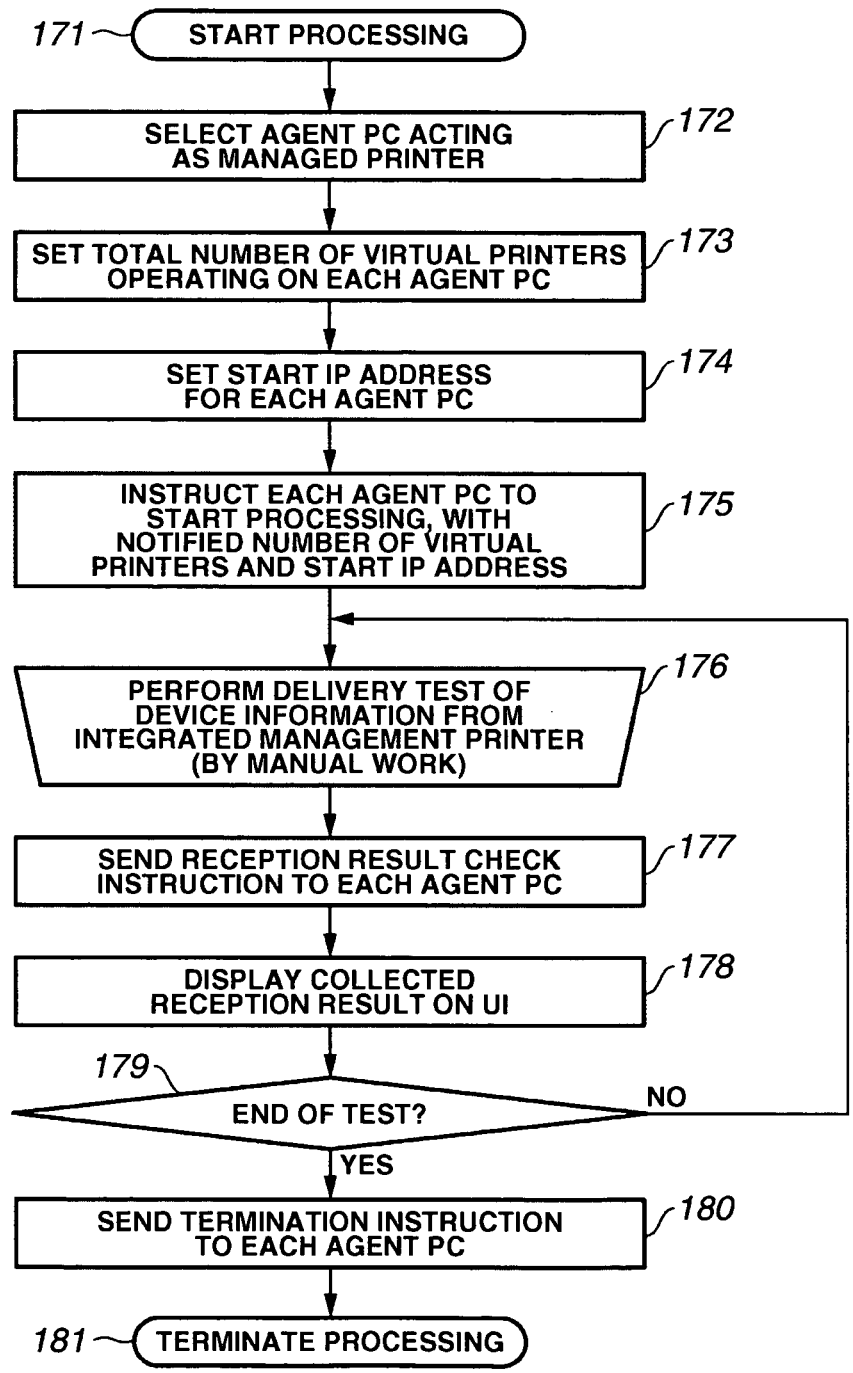
FIG. 13 is a flowchart showing the processing of virtual printer simulator centralized control manager software installed on a virtual printer simulator centralized control manager in accordance with the fifth exemplary embodiment.

FIG. 13 is a flowchart showing exemplary processing of the virtual printer simulator centralized control manager software, installed in the virtual printer simulator centralized control manager PC 52 in accordance with the present exemplary embodiment. The flowchart of FIG. 13 differs from the flowchart of FIG. 10 of the fourth exemplary embodiment in that the test execution processing of step 116 of FIG. 10 is replaced with steps 176 through 179.

A user can manually test a distribution of device information from the integrated management printer 51 to a total of 400 simulator agent PCs (refer to step 176). After finishing the test, the virtual printer simulator centralized control manager software allows a user to instruct each simulator agent PC to execute the reception result check. In response to the user's instruction, the virtual printer simulator centralized control manager software transmits a reception result check instruction to the simulator agent software 59 operating on each simulator agent PC (refer to step 177). In response to the reception result check instruction, the simulator agent software 59 of each simulator agent PC returns reception data or the like to the virtual printer simulator centralized control manager PC 52, as described in the step 154 of FIG. 12.

The virtual printer simulator centralized control manager software displays, on a user interface, the distribution data or its hash value, or checksum collected from the simulator agent software 59 of each simulator agent PC (refer to step 178). Then, the virtual printer simulator centralized control manager software determines whether the test is finished (refer to step 179). When the test is not finished (NO in step 179), the virtual printer simulator centralized control manager software repeats the above-described processing of steps 176 through 179.

As described above, the software evaluation method of the present exemplary embodiment includes a managing step of collecting the result of predetermined processing executed by the device information reception software, such as reception of distributed data, and returning a reply including the collected result.

According to the present exemplary embodiment, the simulator agent software 59 can provide a function of acquiring the distribution result in addition to the function of instructing initiation and termination of a test. Thus, the time and labor of an operator required for a test can be reduced. For example, a user can realize a large-scale communication test, e.g., distributing the device information from one printer to several hundreds or thousands of printers, by operating one printer and one virtual printer simulator centralized control manager PC.

Sixth Exemplary Embodiment

A sixth exemplary embodiment of the present invention relates to an evaluation system using the system arrangement shown in the above-described fourth and fifth exemplary embodiments, which is applicable in a case that the device information receiving section uses the web service technique described in the third exemplary embodiment.

Figure 14:
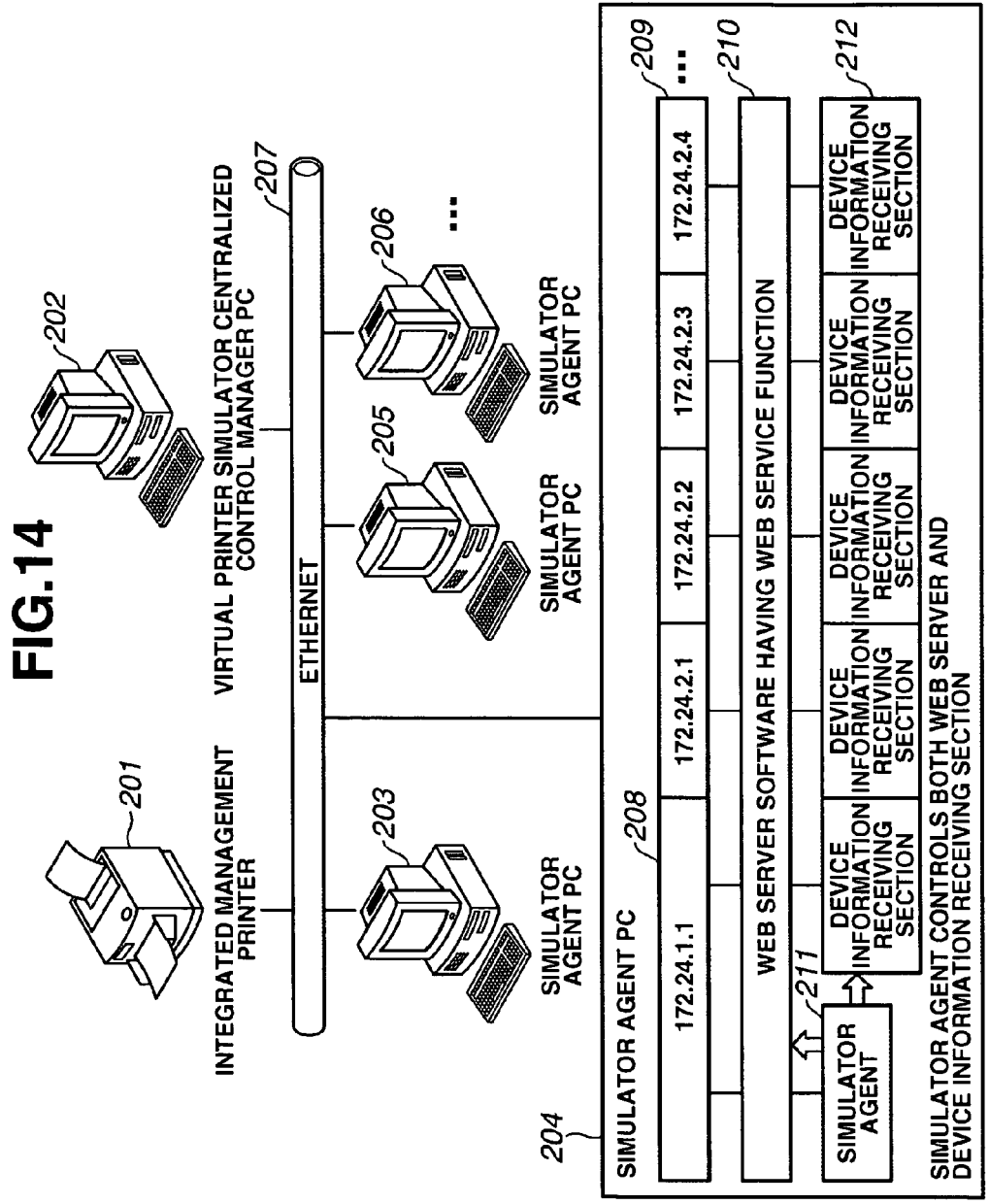
FIG. 14 is a schematic diagram showing a software evaluation system in accordance with a sixth exemplary embodiment of the present invention.

FIG. 14 shows the arrangement of a software evaluation system in accordance with the present exemplary embodiment. Similar to the system of the third exemplary embodiment shown in FIG. 6, the software evaluation system of FIG. 14 includes an integrated management printer 201, a virtual printer simulator centralized control manager PC 202, and plural simulator agent PCs 203 to 206 which are connected via an Ethernet (registered trademark) 207. Each simulator agent PC includes simulator agent software 211, installed as web service, which integrally controls plural device information receiving sections in the simulator agent PC.

The virtual printer simulator centralized control manager software of the virtual printer simulator centralized control manager PC 202 can control the simulator agent software 211 of each simulator agent PC. The control can be executed by using an IP address 208 allocated to the simulator agent PC via Web server software 210 having a web service function.

Figure 15:
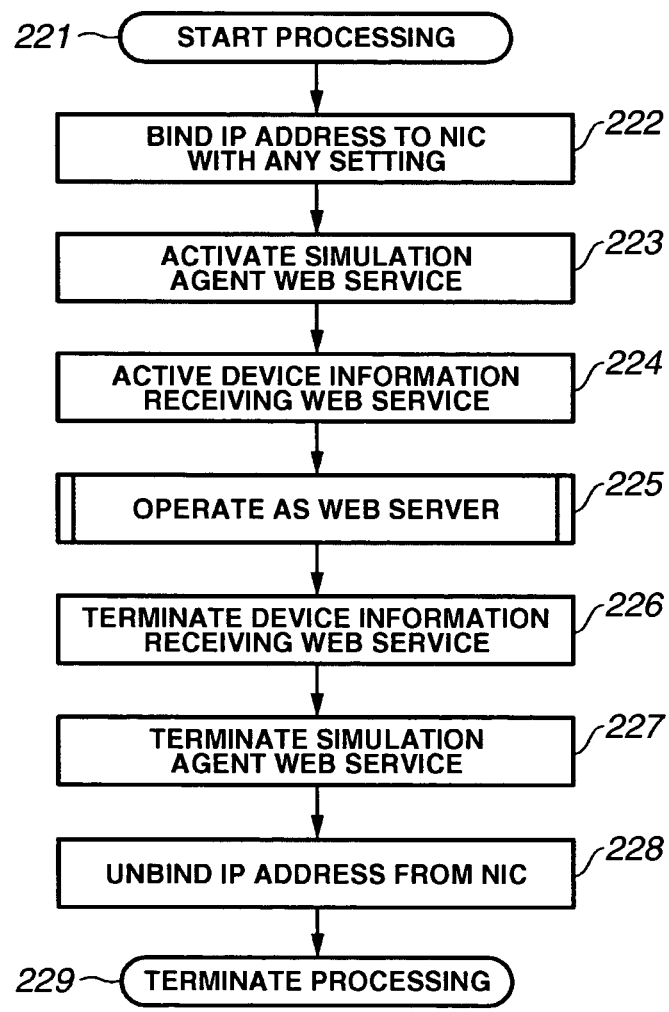
FIG. 15 is a flowchart showing exemplary processing relating to the software evaluation, included in the processing of web server software shown in FIG. 14.

FIG. 15 is a flowchart showing exemplary processing relating to the software evaluation of the present invention, included in the processing of the web server software 210. After starting the processing (refer to step 221), the web server software 210 binds IP addresses with ANY settings, according to which all IP addresses allocated to the NIC can be used (refer to step 222). Allocation of plural IP addresses to the NIC can be performed by allocating plural IP addresses to one NIC. When plural NICs are used, one IP address or plural IP addresses can be allocated to each NIC.

Next, the web server software 210 activates the web service functioning as simulator agent software (refer to step 223). Then, the web server software 210 activates the device information receiving web service ported from a managed printer (refer to step 224). Then, the web server software 210 starts an operation (refer to step 225). After the operation is finished, the web server software 210 terminates the device information receiving web service (refer to step 226) and then terminates the simulator agent web service (refer to step 227). Then, the web server software 210 unbinds all IP addresses allocated to the NIC (refer to step 228). The process is then terminated at step 229.

Figure 16:
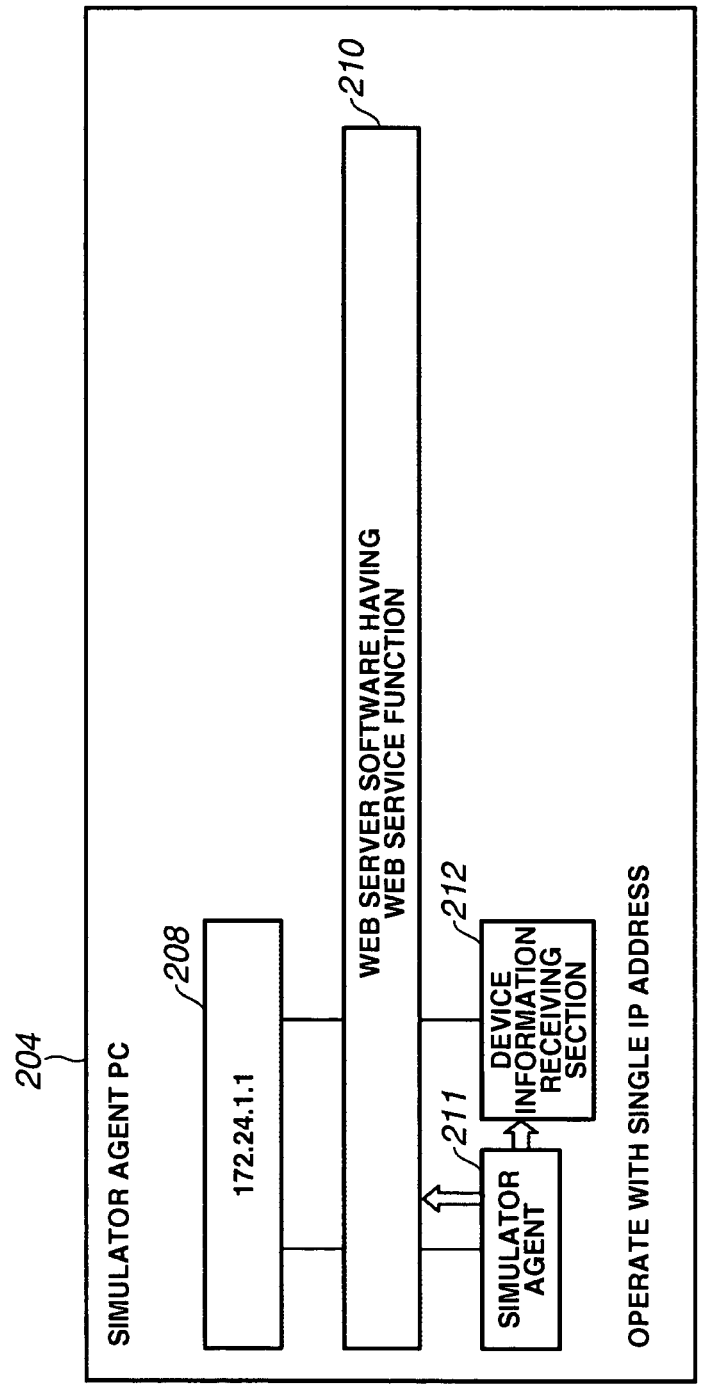
FIG. 16 is a schematic diagram showing an exemplary internal condition of a simulator agent in a condition the web server from in FIG. 15 is operating.

FIG. 16 shows the internal condition of the simulator agent PC 204 (refer to FIG. 14) under the operation of the web server of step 225 shown in FIG. 15. As shown in FIG. 16, the simulator agent web service 211 and the device information receiving sections 212 can communicate with external devices via a single IP address 208.

Figure 17:
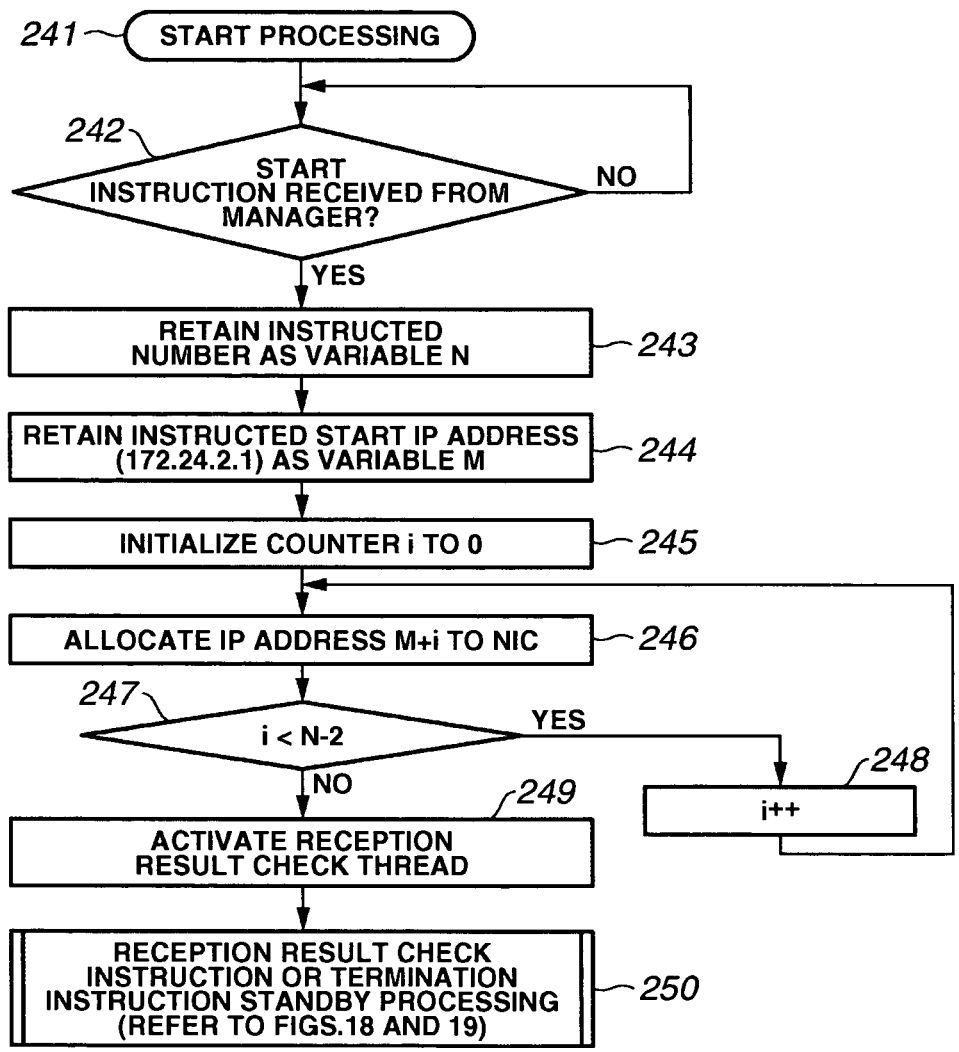
FIG. 17 is a flowchart showing exemplary simulation initiation processing, included in the processing of a simulator agent web service shown in FIG. 14.

FIG. 17 is a flowchart showing exemplary simulation initiation processing, included in the processing of the simulator agent web service 211. After starting the processing (refer to step 241), the simulator agent web service 211 determines whether any instruction is received from the virtual printer simulator centralized control manager PC 202 (refer to step 242).

When a start instruction is received from the virtual printer simulator centralized control manager PC 202 (i.e., YES in step 242), the simulator agent web service 211 retains a setting number included in the instruction as a variable N (refer to step 243). Next, the simulator agent web service 211 retains a start IP address included in the instruction as a variable M (refer to step 244). Then, the simulator agent web service 211 initializes the counter i to zero (refer to step 245).

Next, the simulator agent web service 211 allocates an IP address M+i to the NIC of the simulator agent PC (refer to step 246). Then, the simulator agent web service 211 determines whether the counter i is less than N−2 (refer to step 247). When the counter i has not reached N−2 (i.e., YES in step 247), the simulator agent web service 211 increments the counter i by one (refer to step 248) and repeats the above-described steps 246 and 247 until the counter i reaches N−2. Through the above-described processing, a total of N IP addresses can be allocated.

When the counter i has reached N−2 (i.e., NO in step 247), the simulator agent web service 211 activates the reception result check thread (refer to step 249). Then, the simulator agent web service 211 waits for a reception result check instruction or a termination instruction transmitted from the virtual printer simulator centralized control manager PC 202 (refer to step 250).

Figure 18:
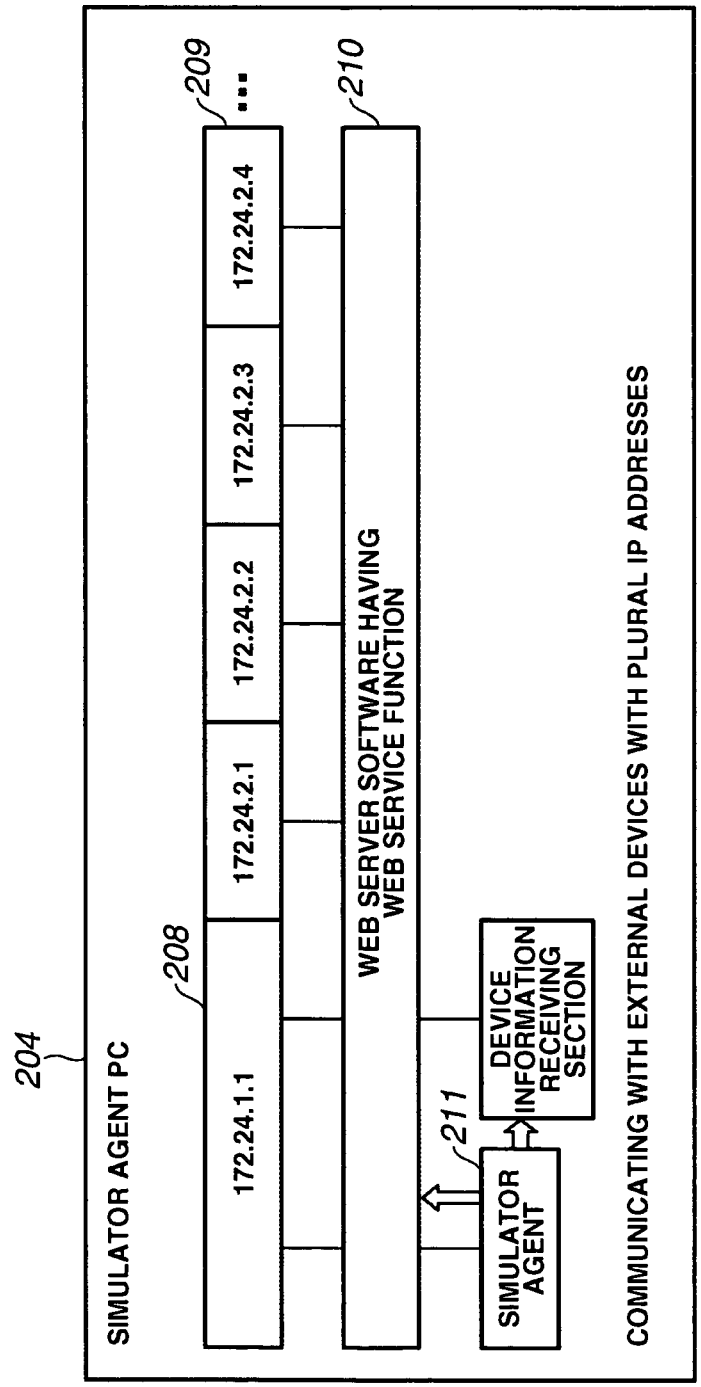
FIG. 18 is a schematic diagram showing an exemplary internal connection in the simulator agent during the simulation initiation processing.

As described above, the web server software 210 binds the IP address to the NIC with any settings. FIG. 18 shows the internal condition of the simulator agent PC 204 in the conditions of the step 250. More specifically, the simulator agent web service 211 and the device information receiving section 212 can communicate with external devices via plural IP addresses (208 and 209).

Figure 19:
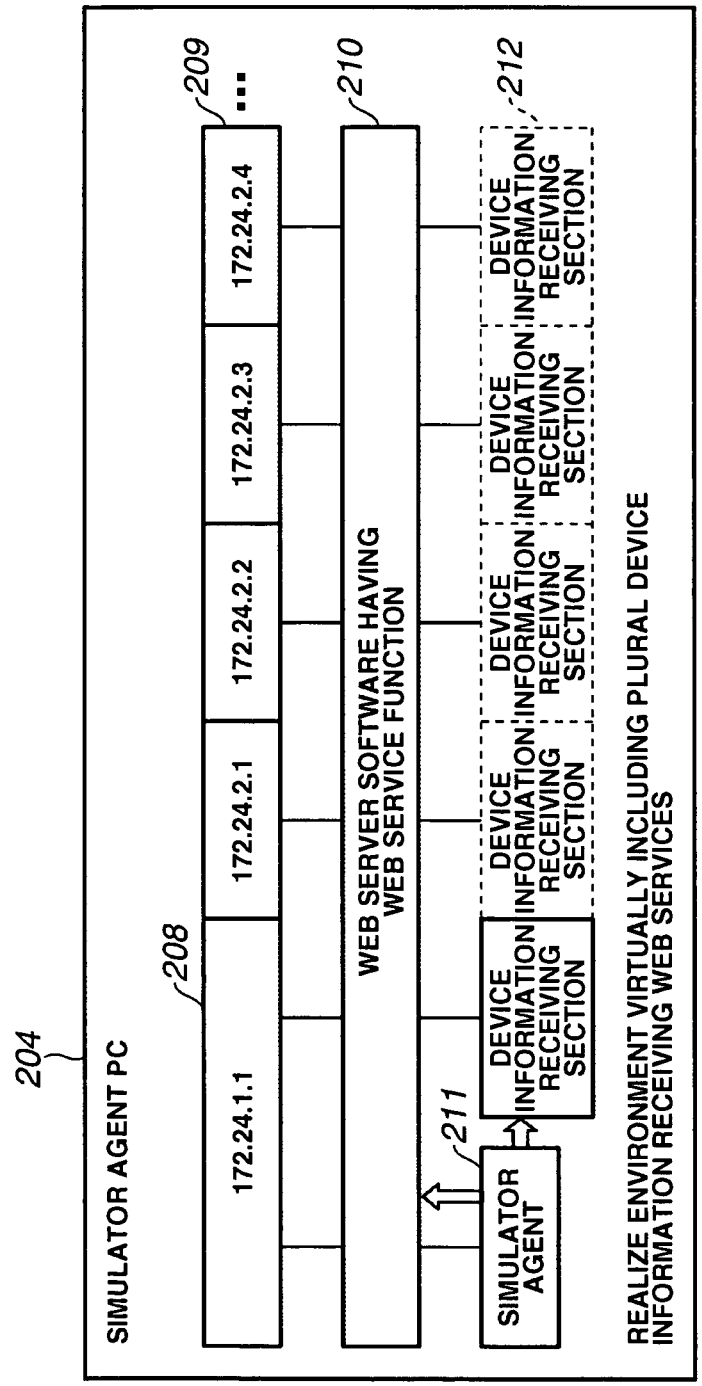
FIG. 19 is a schematic diagram showing plural managed printers each having device information receiving web service, operating in the connection shown in FIG. 18.

When seen from the integrated management printer 201 (refer to FIG. 14) via an Ethernet (registered trademark) 207, the condition of FIG. 18 is equivalent to the condition shown in FIG. 19, according to which a total of N managed printers each having a device information receiving web service can operate simultaneously. In other words, a user can test a distribution of device information from the integrated management printer 201 to plural printers.

Figure 20:
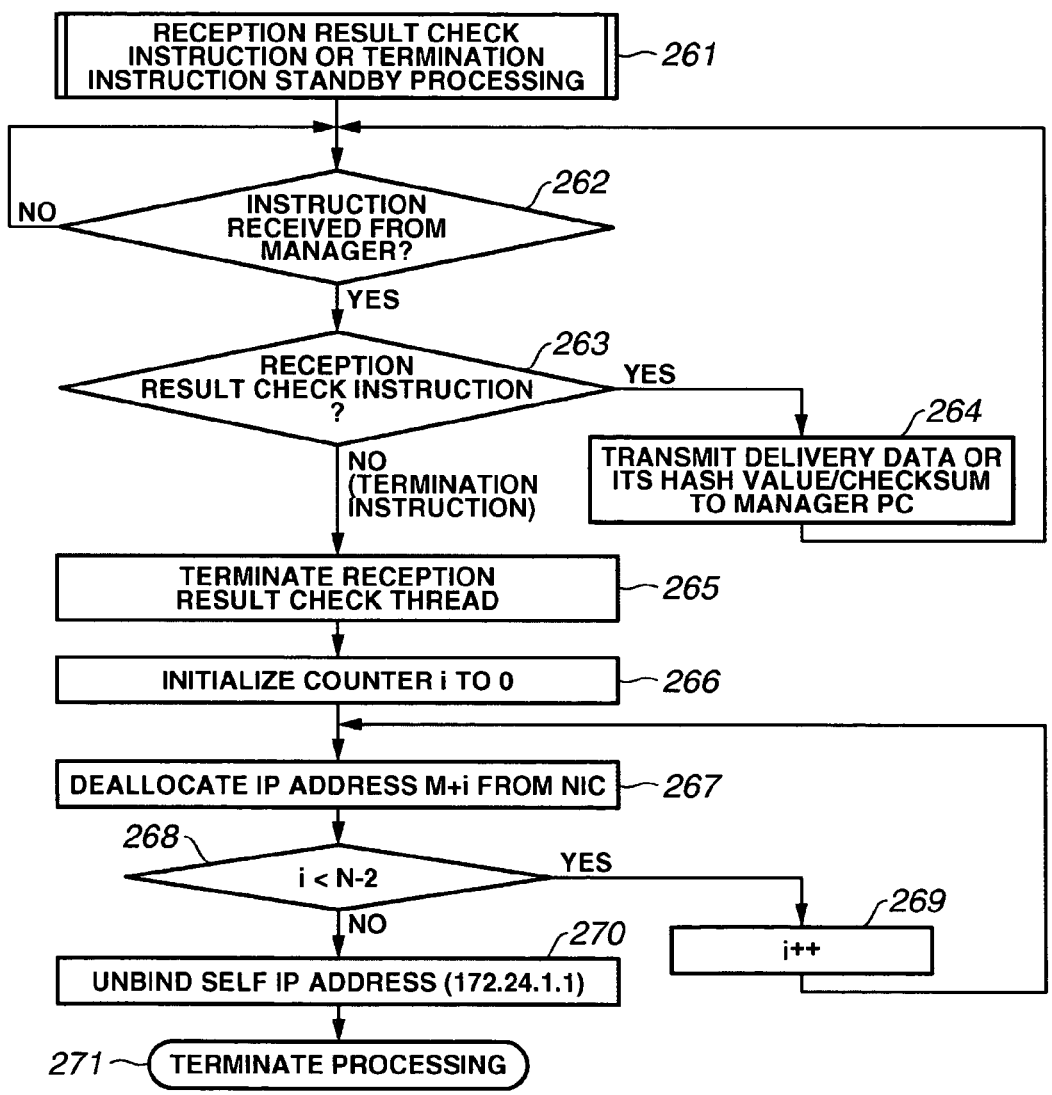
FIG. 20 is a flowchart showing exemplary simulation termination processing, included in the processing of simulator agent web service in accordance with the sixth exemplary embodiment.

FIG. 20 is a flowchart showing exemplary simulation termination processing, included in the processing of the simulator agent web service 211 in accordance with the present exemplary embodiment. The simulator agent web service 211 waits for a reception result check instruction or a termination instruction (refer to step 261). The simulator agent web service 211 determines whether any instruction is received from the virtual printer simulator centralized control manager PC 202 (refer to step 262).

When any instruction is received (i.e., YES in step 262), the simulator agent web service 211 determines whether a reception result check instruction is received (refer to step 263). When the reception result check instruction is received (i.e., YES in step 263), the simulator agent web service 211 collects the reception data from respective information receiving threads that receive device information from the integrated management printer 201, by using the reception result check thread activated in the step 249 of FIG. 17. Then, the simulator agent web service 211 sends the reception data or its hash value, or checksum to the virtual printer simulator centralized control manager PC 202 (refer to step 264).

When the received instruction is a termination instruction (i.e., NO in step 263), the simulator agent web service 211 completes the reception result check thread (refer to step 265). After completing the reception result check thread, the simulator agent web service 211 initializes the counter i to zero (refer to step 266). Next, the simulator agent web service 211 deallocates the IP address M+i from the NIC (refer to step 267). Then, the simulator agent web service 211 determines whether the counter i is less than N−2 (refer to step 268). If the counter i has not reached N−2 (i.e., YES in step 268), the simulator agent web service 211 increments the counter i by one (refer to step 269) and repeats the steps of 267 and 268 until the counter i reaches N−2.

If the counter i has reached N−2 (i.e., NO in step 268), and after completing the deallocation of the IP addresses, the simulator agent web service 211 unbinds the self IP address (refer to step 270) before terminating this routine (refer to step 271). In this manner, in a PC or a general information device including device information receiving sections virtually operating as plural managed printers, the simulator agent web service 211 can intercept communication contents between the device information receiving sections and the virtual printer simulator centralized control manager.

Then, the simulator agent web service 211 can send the information including the intercepted communication results to the virtual printer simulator centralized control manager. The virtual printer simulator centralized control manager can display the communication results. Instead of displaying the communication results, it is possible to store the communication results in a predetermined memory. The processing of the virtual printer simulator centralized control manager software, installed on the virtual printer simulator centralized control manager PC 202 of the present exemplary embodiment is similar with the processing described with reference to FIG. 13 and will not be described below.

According to the present exemplary embodiment, in the device information distribution test using the web service technique, the total number of simulators can be dynamically increased or decreased without stopping the device information receiving web service. Increasing or decreasing the number of simulators can be realized by using plural types of receiving sections. For example, when there are two printer types A and B, the simulation during a predetermined period of time can be performed by using a combination of 20 receiving sections of type A and 50 receiving sections of B type and the simulation during the next predetermined period of time can be performed by using a combination of 40 receiving sections of type A and 30 receiving sections of B type.

The virtual printer simulator centralized controlling PC 202 can perform the centralized control for the simulation in an environment including various types of printers changed at predetermined intervals, with a scenario including the settings relating to the total number of printer types and the period of their use. Thus, the simulation test in the environment including various types of printers can be automated and accordingly the labor hour of an operator and the cost can be reduced.

Furthermore, the simulator agent web service 211 can install the device information receiving web service on the simulator agent PC at the timing of the step 223 of FIG. 15. Furthermore, the simulator agent web service 211 can uninstall the device information receiving web service after completing the step 227 of FIG. 15. The step 224 shown in FIG. 15 (i.e., the processing for activating the device information receiving web service) is not temporally dependent on the step 246 shown in FIG. 17 (i.e., the processing for allocating the IP address to the NIC).

Thus, the order of executing these steps can be changed. Furthermore, the step 226 shown in FIG. 15 (i.e., the processing for terminating the device information receiving web service) is not temporally dependent on the step 267 shown in FIG. 20 (i.e., the processing for deallocating the IP address from the NIC). Thus, the order of executing these steps can be changed.

Furthermore, the present invention is characterized in that, instead of using a printer, a general information device can be used as a receiver of the device information. The above-described arrangement of the present exemplary embodiment does not depend on the throughput rate or speed of a simulator agent PC. The throughput rate or speed is, for example, adjustable by adding the weight processing to the processing ported from a managed printer. Furthermore, the present exemplary embodiment uses a PC as a general information device. However, the PC is a mere example. According to the present invention, a printer can be replaced with any other information device capable of receiving the device information Therefore, in the present exemplary embodiment, the PC can be replaced with a PDA, a portable telephone, or a server. Furthermore, the distributor is not limited to a printer. For example, as shown in FIG. 3, the integrated management printer acting as a distributor can be replaced with an integrated managing PC.

Seventh Exemplary Embodiment

According to the arrangement of the sixth exemplary embodiment shown in FIG. 19, the simulator agent has only one web service. Accordingly, when there is an access to the web service via each IP address, the contents of a reply from the web service must be differentiated according to each IP address. Hereinafter, as an example, a managed printer having a UDDI (Universal Description Discovery and Integration) service function will be described.

The UDDI service function allows a managed printer to register the self device information receiving web service. In general, the UDDI service includes a UDDI registry and a web service managing an incoming access to the UDDI registry. The UDDI service uses general-purpose codes regardless of the type of a managed printer or without considering the use in a simulation (for example, as described in the sixth exemplary embodiment).

In such a case, to enable a simulator to accurately simulate the function of a managed printer, a reply returned from the UDDI service must be changed for each IP address. Intentionally rewriting the code of the web service according to such changes will increase the cost. The rewriting operation may cause additional problems. Thus, the simulator may not be able to maintain the quality. The software evaluation system according to the present invention can solve such problems by using a web service response filter.

Figure 21:
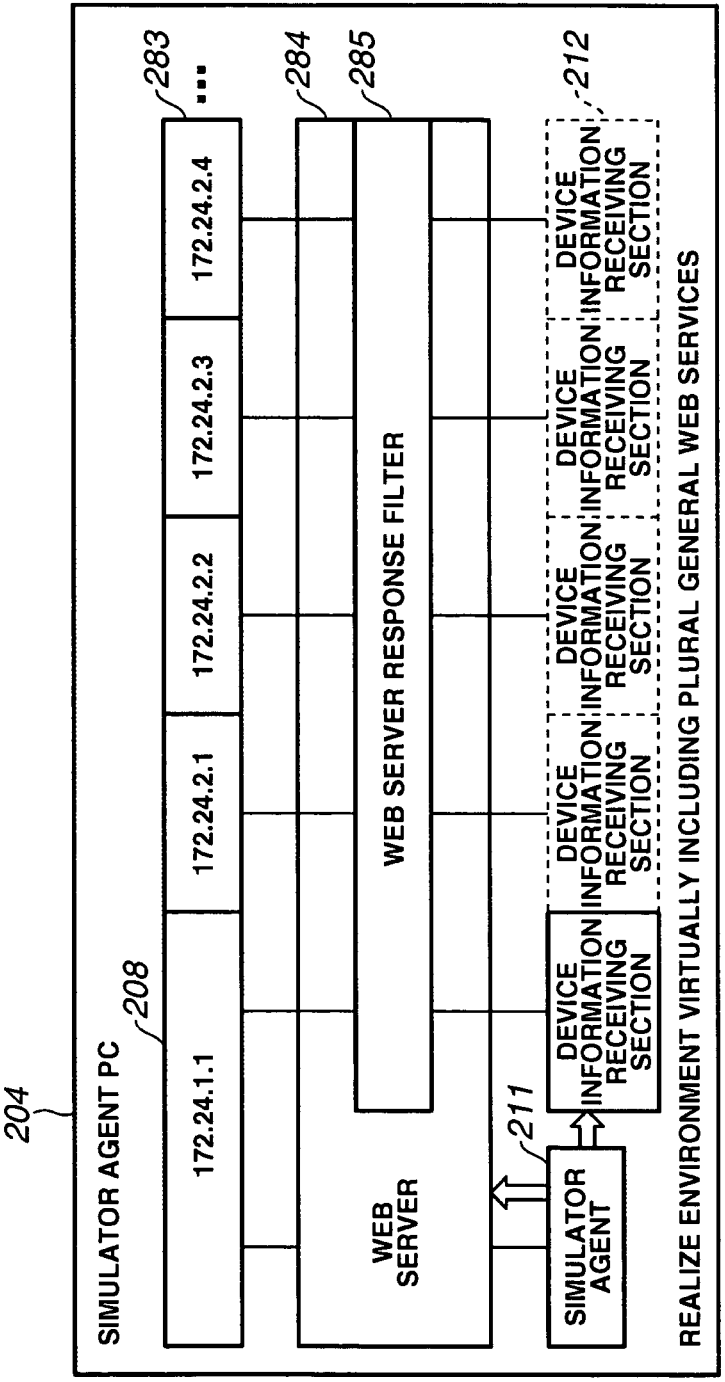
FIG. 21 is a schematic diagram showing an internal connection in the simulator agent, included in a software evaluation system in accordance with a seventh exemplary embodiment of the present invention.

FIG. 21 shows the internal condition of the simulator agent PC 204 (refer to FIG. 14) in a software evaluation system in accordance with a seventh exemplary embodiment of the present invention, similar to FIG. 19 of the sixth exemplary embodiment. The condition shown in FIG. 21 differs from the condition shown in FIG. 19 in that a web service response filter 285 is installed in the web server software 284.

Figure 22:
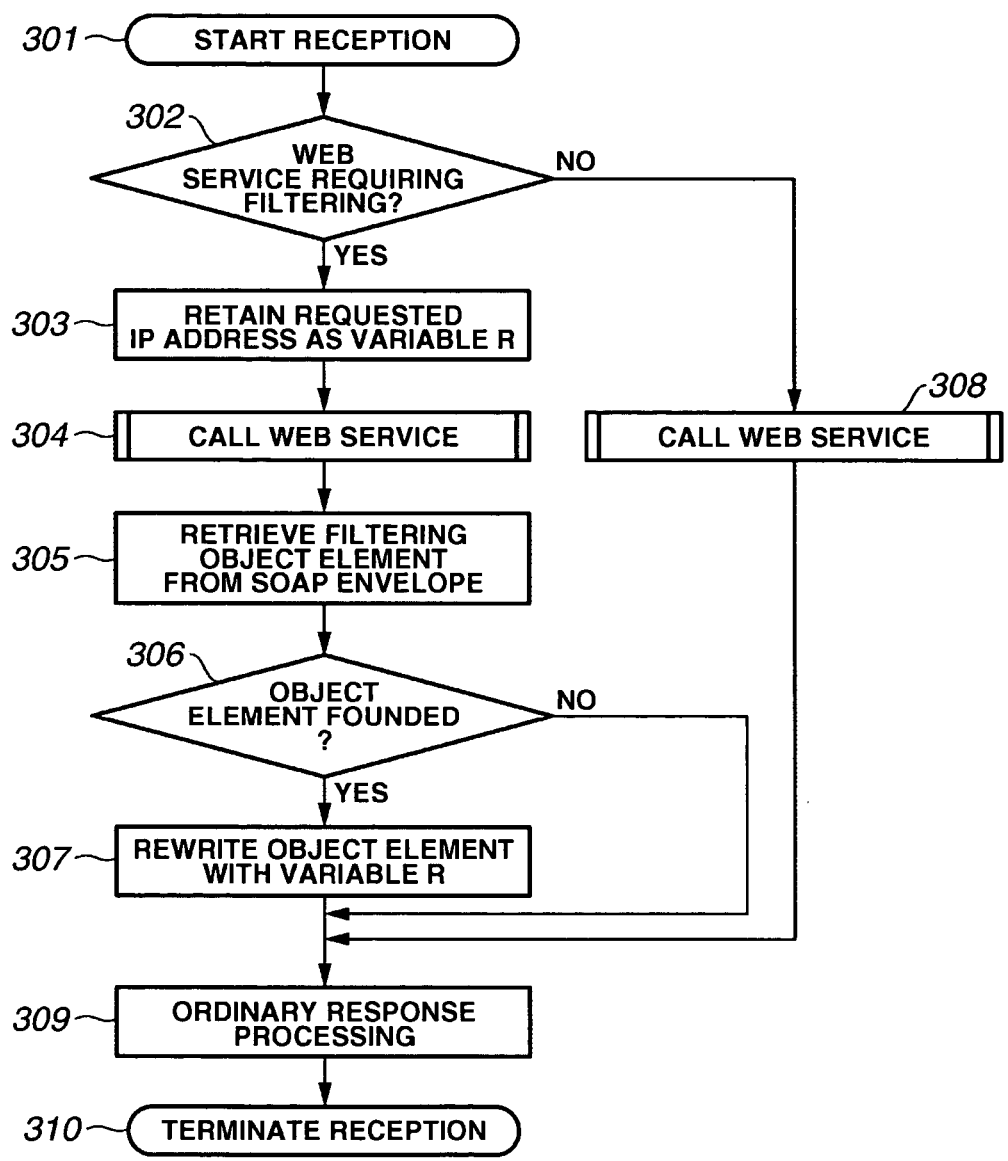
FIG. 22 is a flowchart showing the exemplary processing of a web service response filter shown in FIG. 21.

FIG. 22 is a flowchart showing exemplary processing of the web service response filter 285 shown in FIG. 21. After starting the reception processing in the condition shown in FIG. 21 (refer to step 301), the web service response filter 285 determines whether the reception processing is a web service being set beforehand as requiring a filtering (refer to step 302). When the reception processing is a web service requiring a filtering (i.e., YES in step 302), the web service response filter 285 retains a requested destination IP address (included in a header of a HTTP request) as a variable R (refer to step 303). Next, the web service response filter 285 calls a web service (refer to step 304).

After completing the calling of the web service, the web service response filter 285 retrieves a filtering object element from a SOAP Envelope contained in the reply (refer to step 305). "SOAP" is abbreviation of SIMPLE OBJECT ACCESS PROTOCO (hereinafter, simply referred to as "SOAP"). The web service response filter 285 determines whether any filtering object element is found (refer to step 306). When a filtering object element is found (i.e., YES in step 306), the web service response filter 285 rewrites the contents of the object element with the variable R (refer to step 307). Through the rewriting of the IP address, the reception processing can be associated with a device information receiving section of the managed printer.

Next, the web service response filter 285 executes the ordinary response processing (refer to step 309) and then terminates the response processing (refer to step 310). When the reception processing is not a web service requiring a filtering (i.e., NO in step 302), the web service response filter 285 calls the web server software (refer to step 308) and executes the ordinary response processing (refer to step 309).

Figure 23:
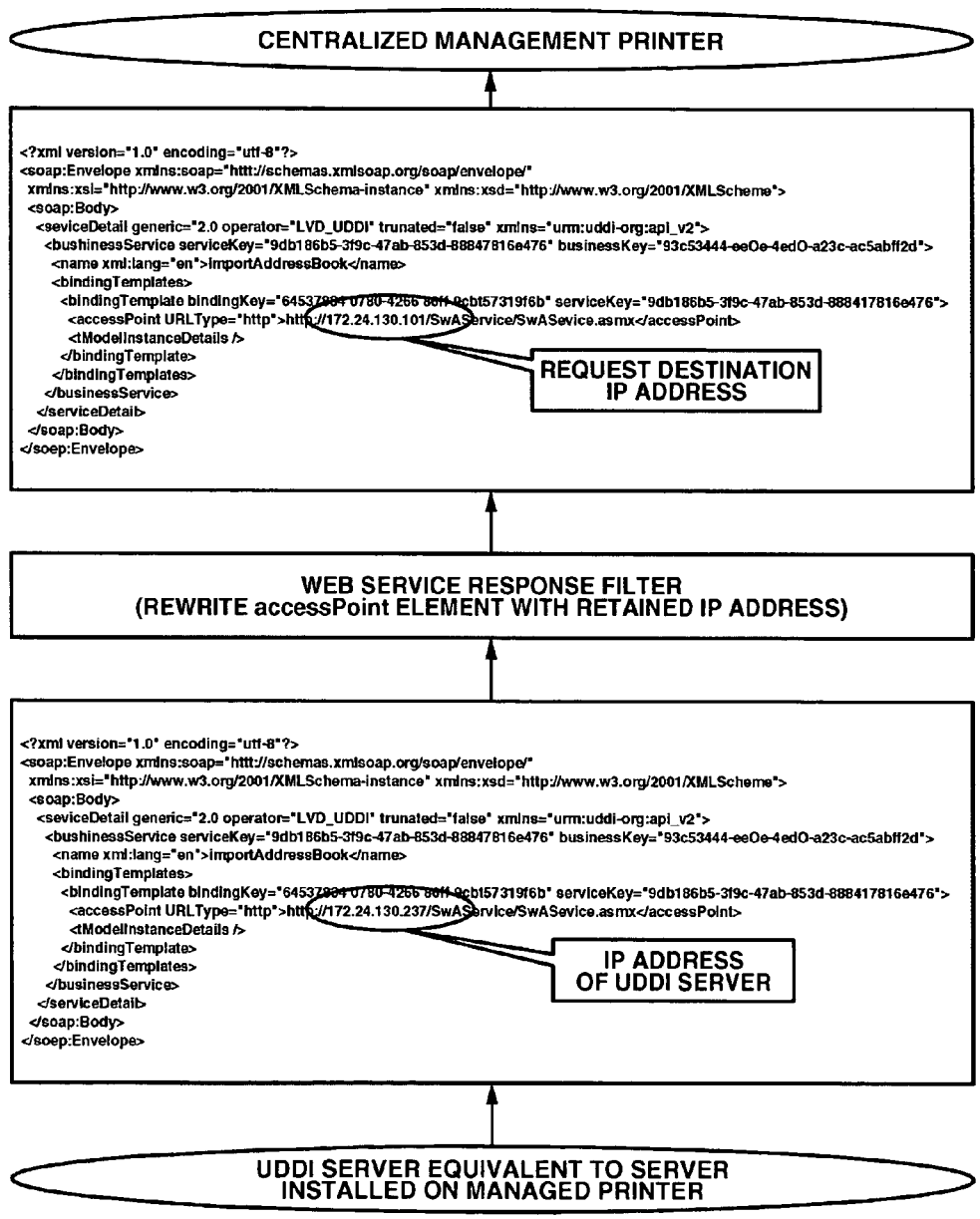
FIG. 23 is a diagram showing exemplary change of reply contents according to the processing of the web service response filter shown in FIG. 22.

FIG. 23 shows an example of the web service response filter 285 that changes the contents of a response, wherein a managed printer has a UDDI service function. In general, the response from the UDDI service includes an access destination URL of the web service as an access Point element. According to the example shown in FIG. 23, the access point element is rewritten from an original IP address 208 of the simulator agent PC to the requested IP address 283 shown in FIG. 21. Thus, for each IP address, it becomes possible to accurately simulate a managed printer. Due to improvement of the simulation rate, it is unnecessary to differently execute a test for the UDDI portion. More specifically, the cost required to the device information distribution test can be reduced.

The example shown in FIG. 23 changes the response from the UDDI service of a managed printer. The processing of the web service response filter shown in the present exemplary embodiment is not limited to the change of a response from the UDDI service. For example, in the step 303 of FIG. 22, the contents of the distribution delivered from the integrated management printer can be stored as a log in a file. Alternatively, in the step 307 of FIG. 22, the contents of the response returned to the integrated management printer can be stored as a log in a file.

Furthermore, in the processing including binary data as attachment, the reception result check thread of the sixth exemplary embodiment shown in FIG. 20 can use the log stored in the file to calculate the checksum or the hash value and can use the calculated data in the processing of the step 264 shown in FIG. 20.

Moreover, in a case that the received SOAP Envelope includes the checksum of distribution contents, a checksum can be calculated in the step 303 of FIG. 22 without storing it in a file. The calculated checksum can be compared with the checksum included in the received SOAP Envelope. The success/failure in the reception can be determined based on the comparison result. The judgment result can be sent to the virtual printer simulator centralized control manager 202 (refer to FIG. 14).

Furthermore, the processing shown in FIG. 22 includes the judgment determining whether a filtering is necessary (refer to step 302), executed prior to the calling of the web service. However, the branch judgment to the filtering processing can be executed at the following stages:

i) before desirializing the SOAP Envelope in the reception;
ii) after deserializing the SOAP Envelope in the reception;
iii) before sirializing the SOAP Envelope in the response; and
iv) after serializing the SOAP Envelope in the reception.

Figure 24:
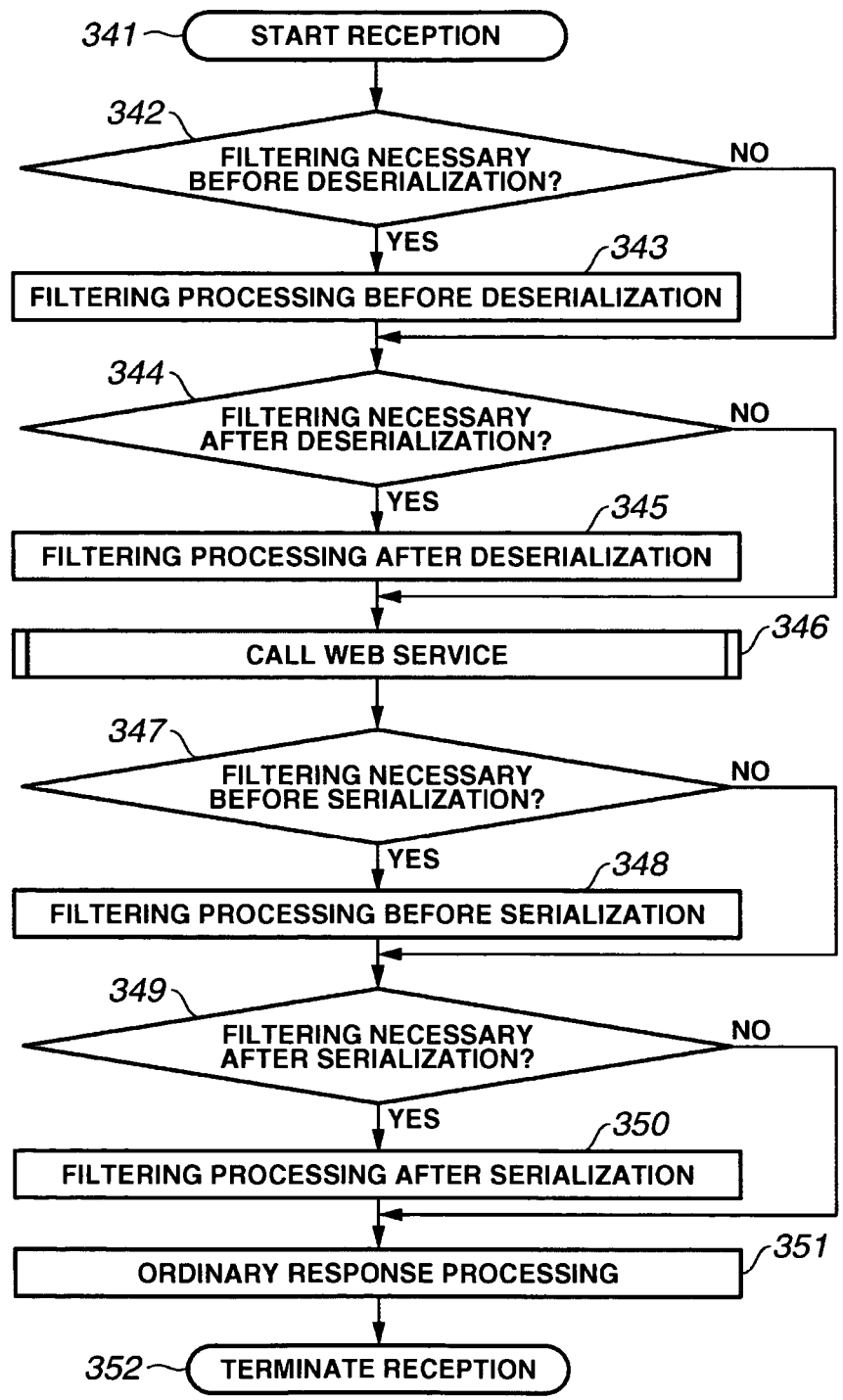
FIG. 24 is a flowchart showing other examples of the processing of the web service response filter shown in FIG. 22.

FIG. 24 is a flowchart showing the exemplary modified processing of the web service response filter, including the branch determination (refer to steps 342, 344, 347, and 349) for executing the filtering processing shown in FIG. 22. In particular, the reception starts at step 341. Next it is determined if filtering is necessary before deserialization (step 342). If yes, filtering processing is implemented before deserialization (step 343). If no, the process proceeds to step 344. Next, it is determined whether filtering is necessary after deserialization (step 344). If yes, filtering processing is implemented after deserialization (step 345). If no, the process proceeds to step 346. Next, web service is called (step 346). Next it is once again determined if filtering is necessary before deserialization (step 347). If yes, filtering processing is implemented before deserialization (step 348). If no, the process proceeds to step 349. Next, it is once again determined whether filtering is necessary after deserialization (step 349). If yes, filtering processing is implemented after deserialization (step 350). If no, the process proceeds to step 351. Then, ordinary response processing is performed (step 351) and then the reception is terminated (step 353).

Eighth Exemplary Embodiment

Figure 25:
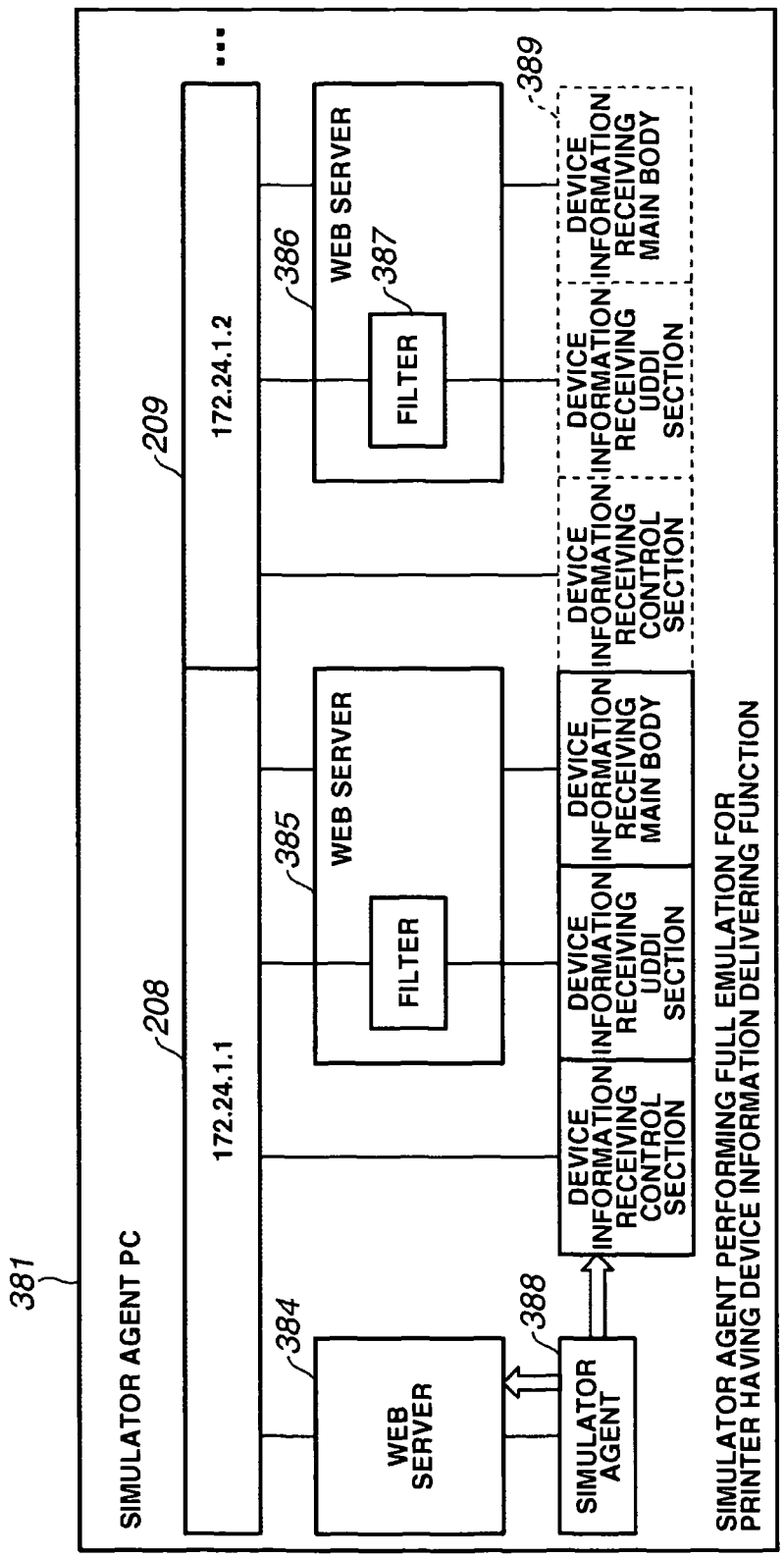
FIG. 25 is a schematic diagram showing an internal condition of the simulator agent PC in accordance with an eighth exemplary embodiment of the present invention in a case where three configurations of the above exemplary embodiments are combined on the simulator agent PC.

An eighth exemplary embodiment of the present invention provides an evaluation system which is similar equivalent to a combination of the systems disclosed in the fifth, sixth, and seventh exemplary embodiments, i.e., the system binding each device information receiving section to an IP address, the system installing each device information receiving section as web service, and the system executing the filtering. FIG. 25 shows the internal arrangement of simulator agent PC in accordance with the eighth exemplary embodiment.

Besides a simulator agent web service 388, a simulator agent PC 381 includes, for each IP address, a combination of a device information receiving control section, a device information receiving UDDI section, and a device information receiving main body section (refer to 389). More specifically, to form the device information receiving control section, the code installed on a managed printer that executes device information related controls can be ported to the simulator agent PC according to a protocol of SNMP or SLP. Furthermore, to form the device information receiving UDDI section, the UDDI service section installed on the managed printer can be ported to the simulator agent PC.

Moreover, to form the device information receiving main body section, the codes for receiving a large amount of device information in a certain data structure, such as the SOAP Envelope, installed in the managed printer can be ported to the simulator agent PC. The device information having a large data size is, for example, an address book used in a multi function peripheral having a printer function and a facsimile function. Although FIG. 25 shows three 3 blocks of the web server (384, 385, and 386), all or at least part of the blocks 384, 385, and 386 can be constituted by the same web server software.

Figure 26:
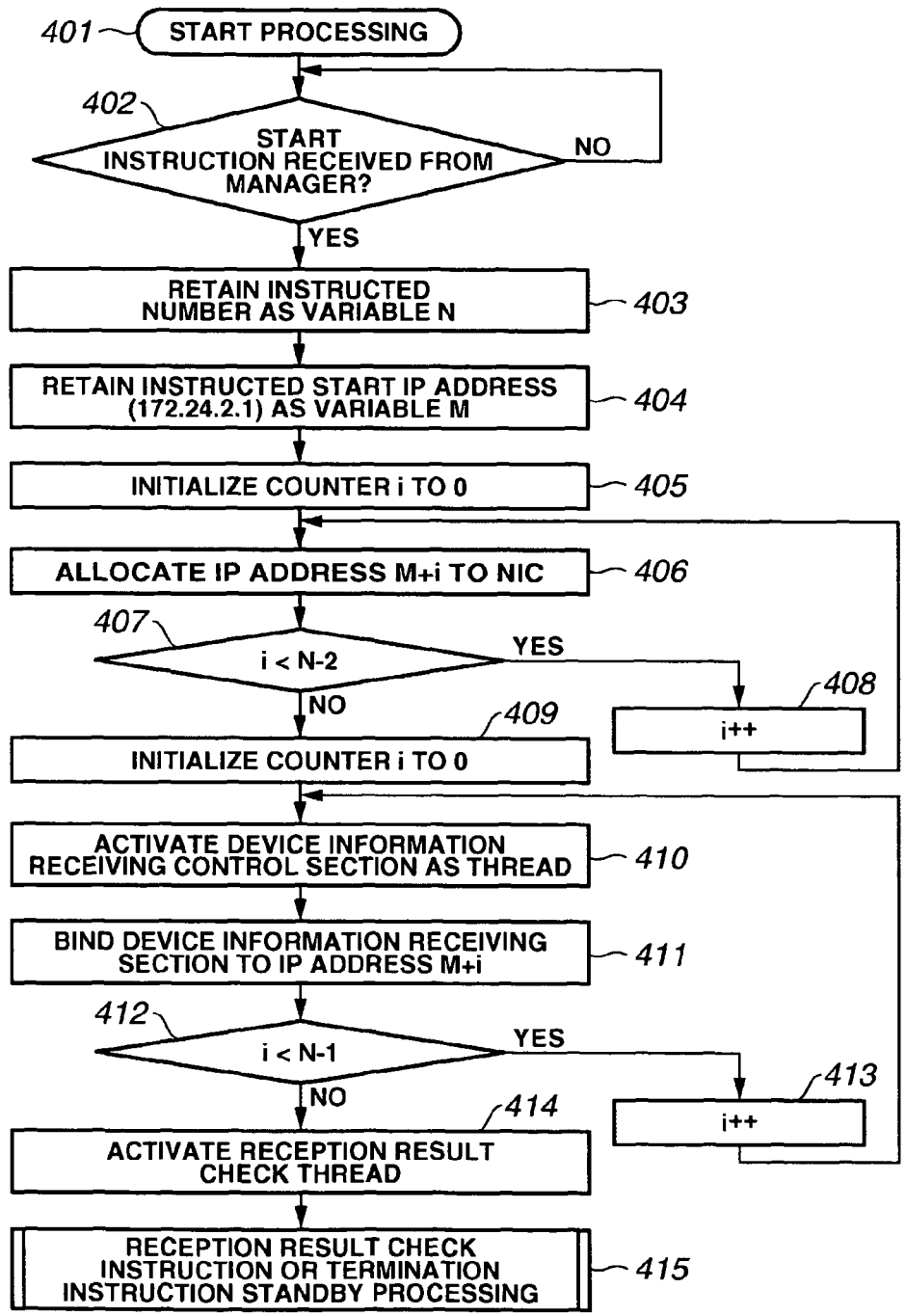
FIG. 26 is a flowchart showing exemplary simulation initiation processing, included in the processing of a simulator agent web service in accordance with the eighth exemplary embodiment.

FIG. 26 is a flowchart showing exemplary simulation initiation processing, included in the processing of the simulator agent web service 388 in accordance with the present exemplary embodiment. After starting the processing (refer to step 401), the simulator agent web service 388 waits for any instruction transmitted from the virtual printer simulator centralized control manager PC 202 (refer to FIG. 14) and determines whether a start instruction is received (refer to step 402). When a start instruction is received from the virtual printer simulator centralized control manager PC 202 (i.e., YES in step 402), the simulator agent web service 388 retains a setting number included in the instruction as a variable N (refer to step 403).

Next, the simulator agent web service 388 retains a start IP address included in the instruction as a variable M (refer to step 404). Then, the simulator agent web service 388 initializes the counter i to zero (refer to step 405). Then, the simulator agent web service 388 allocates an IP address M+i to the NIC of the simulator agent PC (refer to step 406). Then, the simulator agent web service 388 determines whether the counter i is less than N−2 (refer to step 407).

When the counter i has not reached N−2 (i.e., YES in step 407), the simulator agent web service 388 increments the counter i by one (refer to step 408). The simulator agent web service 388 repeats the above-described processing until the counter i reaches N−2. As a practically allocation, plural IP addresses can be allocated to one NIC. Alternatively, it is possible to use plural NICs each having a single IP address. Furthermore, plural IP addresses can be allocated to each of plural NICs. At this moment, the device information receiving main body section has a condition identical with the condition of the sixth exemplary embodiment shown in FIG. 19. Furthermore, the device information receiving UDDI section has a condition identical with the condition of the seventh exemplary embodiment shown in FIG. 21.

Next, the simulator agent web service 388 initializes the counter i to zero (refer to step 409). Then, the simulator agent web service 388 activates the device information receiving section ported from a managed printer as a thread or a process (refer to step 410). Then, the simulator agent web service 388 binds the device information receiving section to an IP address M+i (refer to step 411).

Then, the simulator agent web service 388 determines whether the counter i is less than N−1 (refer to step 412). When the counter i has not reached N−1 (i.e., YES in step 412), the simulator agent web service 388 increments the counter i by one (refer to step 413). The simulator agent web service 388 repeats the above-described processing until the counter i reaches N−1. When the counter i has reached N−1 (i.e., NO in step 412), the simulator agent web service 388 activates the reception result check thread (refer to step 414). Then, the simulator agent web service 388 waits for a reception result check instruction and a termination instruction transmitted from the virtual printer simulator centralized control manager PC 202 (refer to step 415).

At this moment, the simulator agent PC including the device information receiving control section has the internal condition shown in FIG. 25. When the simulator agent web service of each simulator agent PC is in the condition shown in FIG. 25, all of the functions relating to the distribution of device information from the integrated management printer 201 (refer to FIG. 14) to plural destinations can be tested by using the simulator of the present exemplary embodiment.

Figure 27:
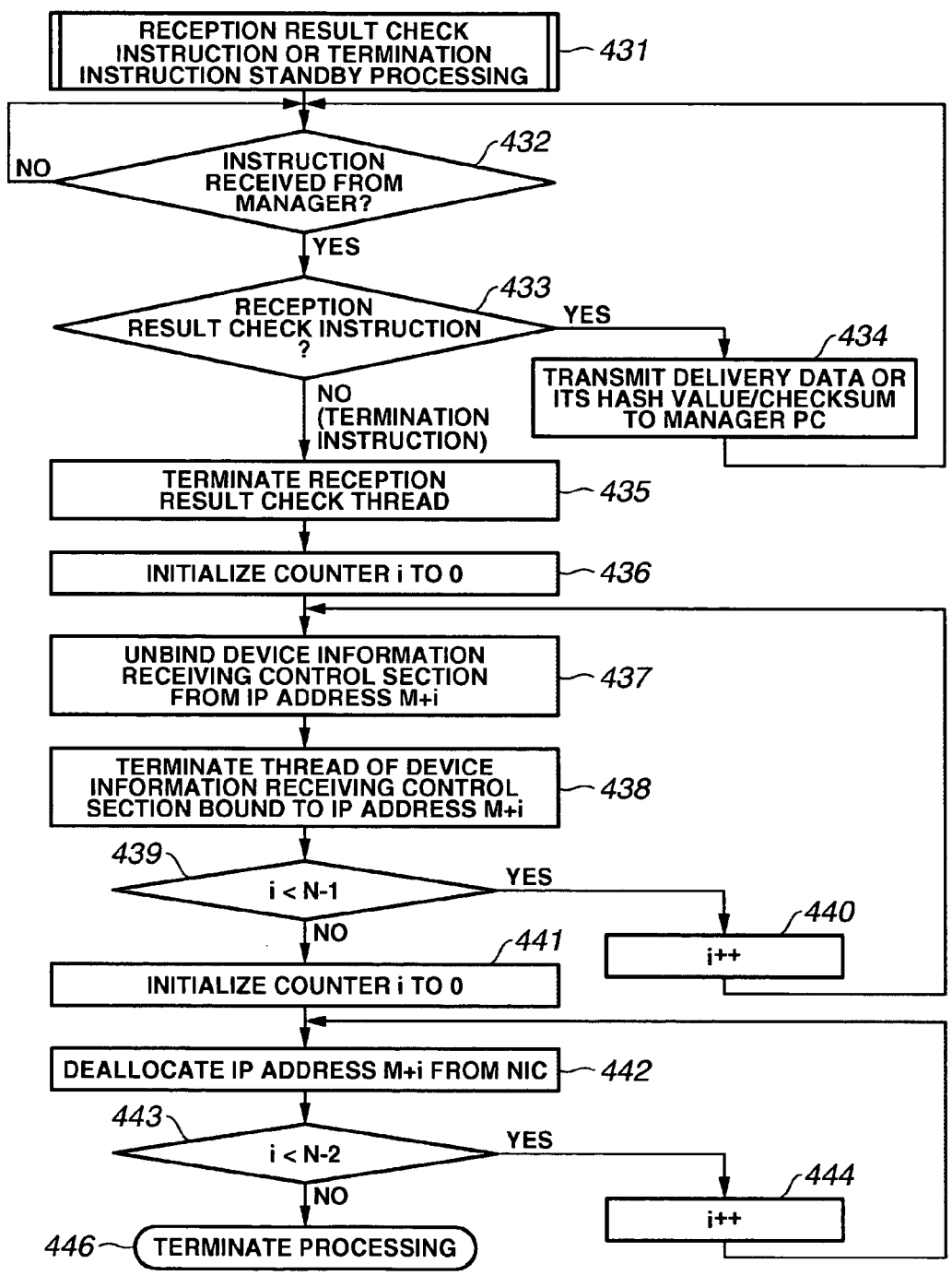
FIG. 27 is a flowchart showing exemplary simulation termination processing, included in the processing of the simulator agent web service in accordance with the eighth exemplary embodiment.

FIG. 27 is a flowchart showing exemplary simulation termination processing, included in the processing of the simulator agent web service 388 in accordance with the present exemplary embodiment. After starting the processing (refer to step 431), the simulator agent web service 388 determines whether any instruction is received from the virtual printer simulator centralized control manager PC 202 (refer to step 432) When any instruction is received (i.e., YES in step 432), the simulator agent web service 388 determines whether a reception result check instruction is received (refer to step 433).

When a reception result check instruction is received (i.e., YES in step 433), the simulator agent web service 388 collects the reception data of respective device information receiving section, from all device information receiving threads using the reception result check thread activated in the step 414 of FIG. 26. Then, the simulator agent web service 388 sends the reception data or its hash value, or checksum to the virtual printer simulator centralized control manager PC 202 (refer to step 434).

When a termination instruction is received (i.e., NO in step 433), the simulator agent web service 388 completes the reception result check thread (refer to step 435). Next, the simulator agent web service 388 initializes the counter i to zero (refer to step 436). Next, the simulator agent web service 388 unbinds the device information receiving section from the IP address M+i (refer to step 437) and completes the thread or process bounded to the IP address M+i (refer to step 438). Then, the simulator agent web service 388 determines whether the counter i is less than N−1 (refer to step 439).

When the counter i has not reached N−1 (i.e., YES in step 439), the simulator agent web service 388 increments the counter i by one (refer to step 440). The simulator agent web service 388 repeats the steps 437 and 438 until the counter i reaches N−1. When the processing for all device information receiving sections is finished (i.e., NO in step 439), the simulator agent web service 388 initializes the counter i to zero (refer to step 441). Next, the simulator agent web service 388 deallocates the IP address M+i from the NIC (refer to step 442). Then, the simulator agent web service 388 determines whether the counter i is less than N−2 (refer to step 443). When the counter i has not reached N−2 (YES in step 443), the simulator agent web service 388 increments the counter i by one (refer to step 444) and repeats the step 442 until the counter i reaches N−2. When the counter i has reaches N−2 (NO in step 443), processing terminates.

In present exemplary embodiment, the processing of the virtual printer simulator centralized control manager software operating on the virtual printer simulator centralized control manager PC 202 is identical with the processing shown in FIG. 13. Furthermore, the processing of the web service response filter 387 is identical with the processing shown in FIG. 22.

As described above, the present exemplary embodiment can simulate a test for distributing the device information to a managed printer having the device information receiving section consisting of a control section, a UDDI section, and main body section. Although the present exemplary embodiment uses a start IP address, the present invention is not dependent on the designation method of the IP address. For example, the start IP address instructed from the virtual printer simulator centralized control manager PC 202 to the simulator agent web service 388 can be replaced with a network address 172.24.1.0.

Furthermore, the contents of the instruction can include not only the start IP address or the network address but also a subnet mask or other supplemental setting data. Although the present exemplary embodiment uses a practical IP address 172.24.1.1, the present invention is not dependent on practical values of the used IP address, the used port, or the use subnet mask.

Furthermore, to form the device information receiving UDDI section of the present exemplary embodiment, the UDDI service section installed on a managed printer is ported to the simulator agent PC. However, because of the use of the web service response filter, the UDDI section can be replaced with general-purpose UDDI server software. Furthermore, the simulator agent PC 381 of the present exemplary embodiment includes a combination of the device information receiving control section, the device information receiving UDDI section, and the device information receiving main body section.

However, one or two sections of the combination can be excluded from the simulator agent PC 381. For example, four simulator agent PCs can include a combination of the control section and the main body section while another four simulator agent PCs can include only the UDDI section. Furthermore, the virtual printer simulator centralized control manager PC 202 can execute the centralized control with a scenario including such differentiated combinations.

When the general-purpose UDDI server software is used in a simulator agent PC under the scenario of using only the UDDI section, the simulator of the present exemplary embodiment can be used to confirm the operation of the UDDI retrieval software not only for a printer but also for any other information device.

Ninth Exemplary Embodiment

The arrangement of the simulator agent of the above-described seventh exemplary embodiment shown in FIG. 21 requires the web server software including the web service response filter. However, there is a case that no web service response filter is available in the web server software. Furthermore, as shown in FIG. 5 of the second exemplary embodiment and FIG. 7 of the fourth exemplary embodiment, the communication protocol may not comply with the web service. In such cases, instead of using the web service response filter, a transfer module can be provided in the simulator agent software. The transfer module can transfer a response received from the device information receiving section to change the contents of the response.

Figure 28:
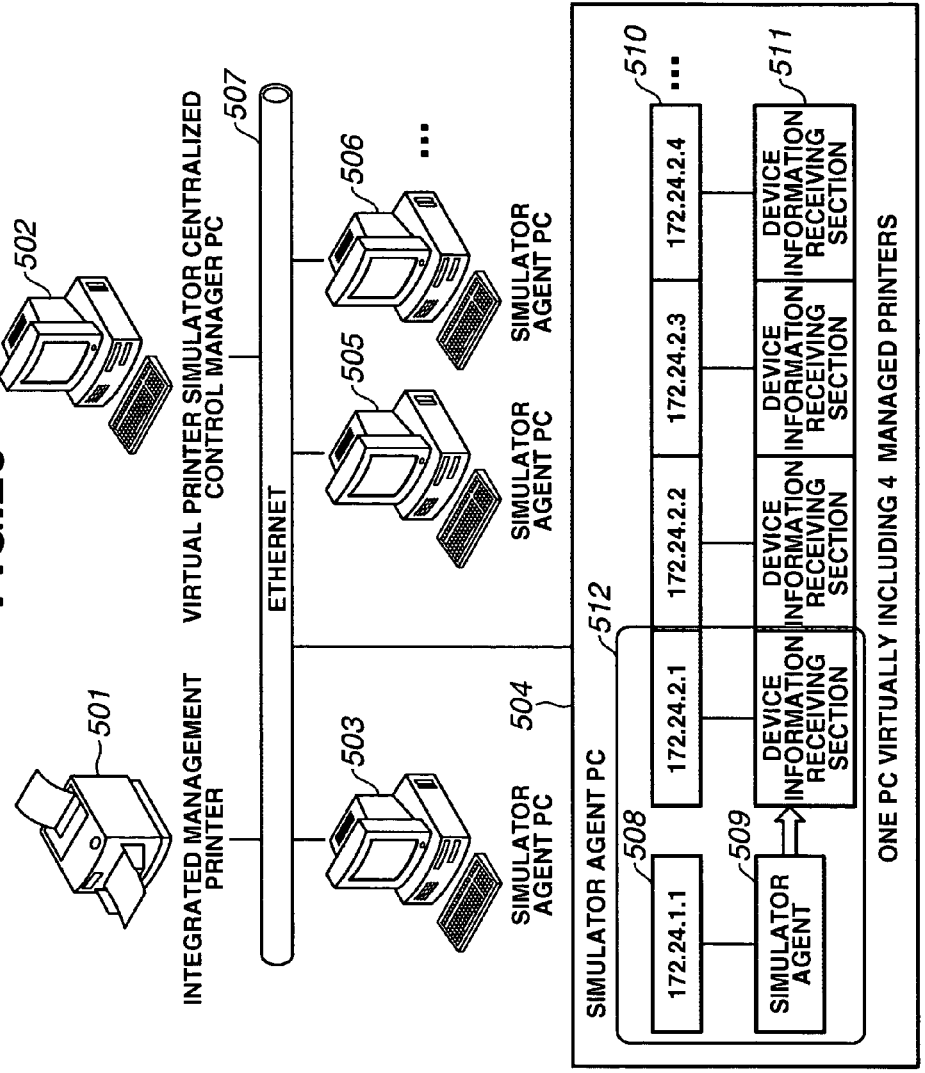
FIG. 28 is a schematic diagram showing an exemplary software evaluation system in accordance with a ninth exemplary embodiment of the present invention.
Figure 29:
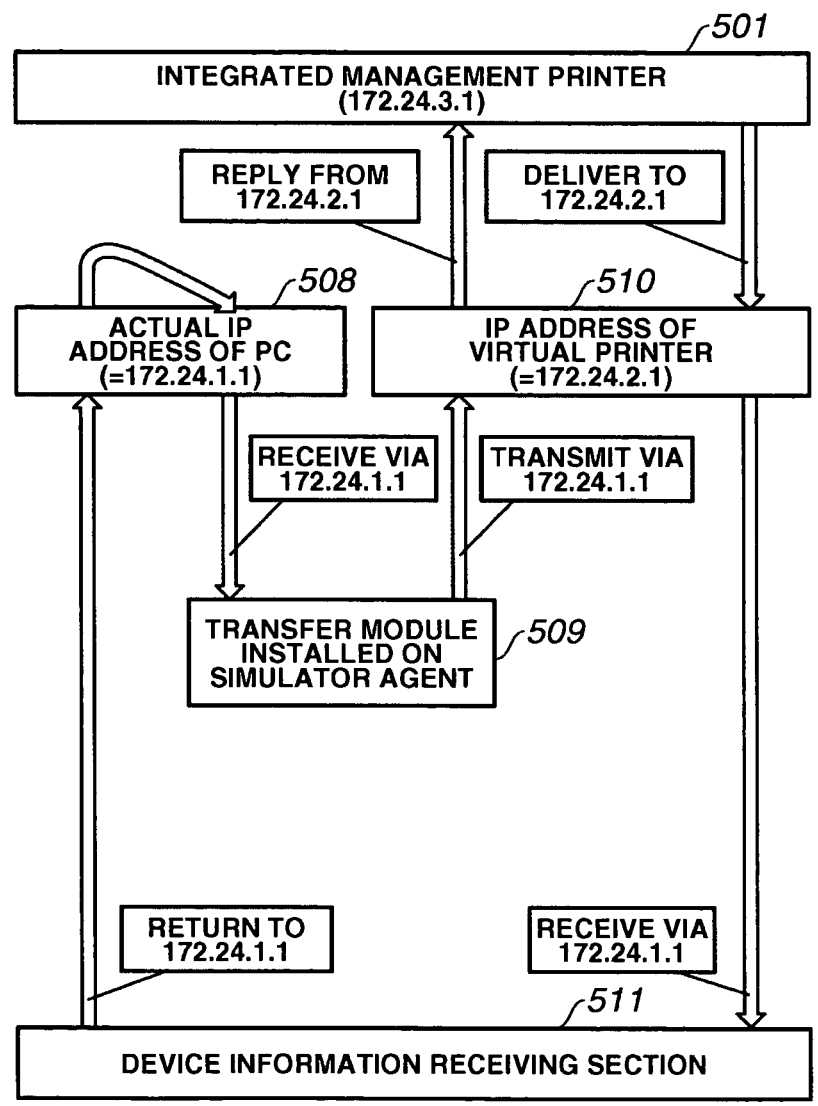
FIG. 29 is a schematic diagram showing exemplary details of the system shown in FIG. 28.

FIGS. 28 and 29 show an example of a transfer module that can change the contents of a response. FIG. 29 shows the details of an encircled portion (512) shown in FIG. 28. In FIG. 29, an integrated management printer 501 distributes device information, via an IP address 510 (i.e., 172.24.2.1) of a virtual managed printer, to a device information receiving section 511. In response to the distribution, the device information receiving section 511 sends a reply to an IP address 508 (i.e., 172.24.1.1) inherently allocated to a simulator agent PC, not the IP address of the integrated management printer 501. A reply packet to the address 172.24.1.1 includes information added beforehand to identify the device information receiving section of the virtual managed printer that sent the reply.

The added information is, for example, a virtual pass included in the URL, or a partly rewritten or added packet. A transfer module 509 installed in the simulator agent software applies the filtering processing to the address 172.24.1.1 as described in the seventh exemplary embodiment, and transfers the reply to the integrated management printer 501.

Figure 30:
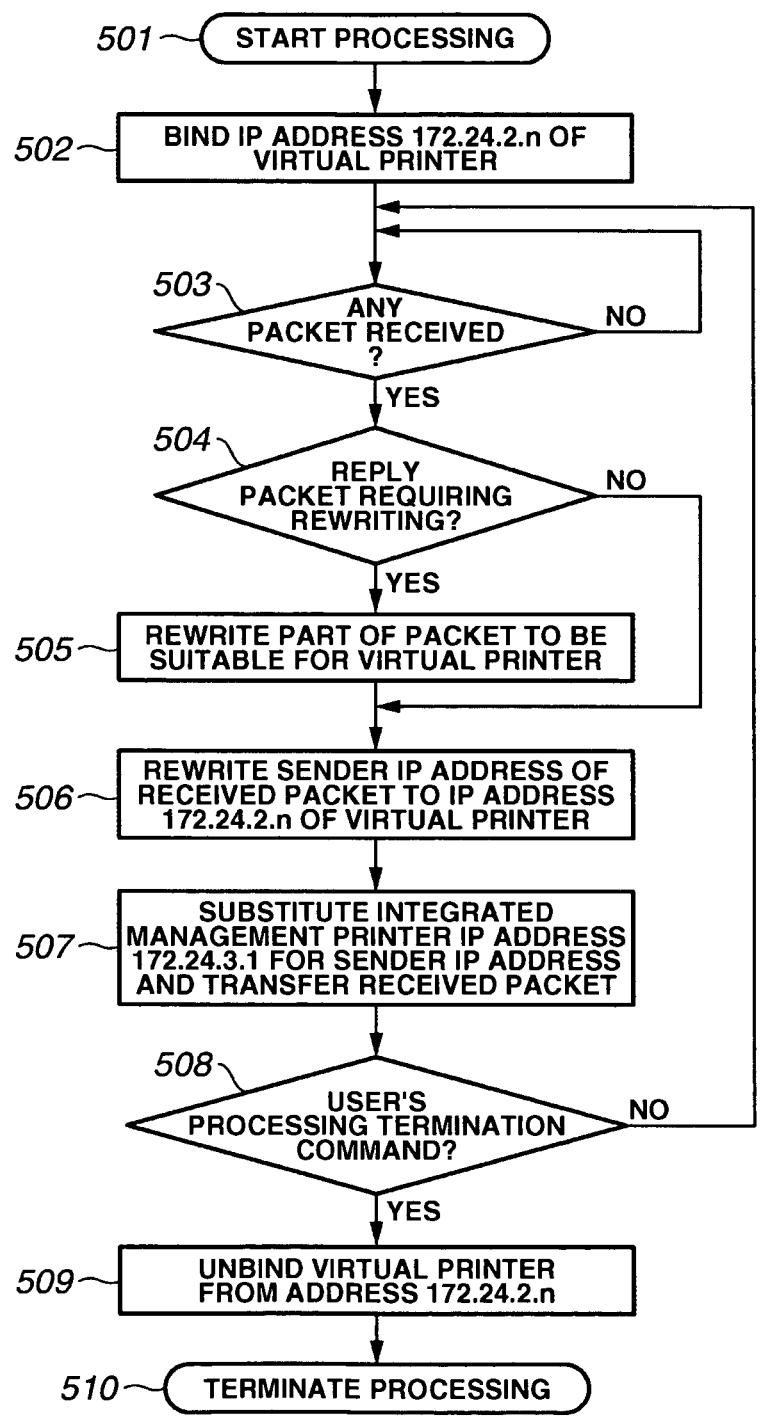
FIG. 30 is a flowchart showing exemplary processing of a transfer module shown in FIG. 29.

FIG. 30 is a flowchart showing the processing of the transfer module 509 shown in FIG. 29. After starting the processing (refer to step 501), the transfer module 509 binds an IP address 172.24.2.n (n is a natural number identifying each virtual managed printer, for example 172.24.2.1) of a virtual managed printer (refer to step 502). Then, the transfer module 509 determines whether any packet is received (refer to step 503). When a packet is received (i.e., YES in step 503), the transfer module 509 determines whether the received packet requires rewriting (refer to step 504).

When the rewriting necessary is necessary (i.e., YES in step 504), the transfer module 509 rewrites part of the packet into the form suitable as a reply from the virtual managed printer (refer to step 505). The rewriting processing can be executed based on the information added beforehand to identify the device information receiving section of the virtual managed printer that sent the reply.

Although the rewritten contents are similar to those shown in FIG. 23, the present exemplary embodiment merely shows that the transfer module can realize the processing comparable with the filtering. Thus, the processing contents are not limited to rewriting of a packet. For example, the reply contents can be stored as a log in a file.

Next, the transfer module 509 rewrites a sender IP address of the received packet into an IP address 172.24.2.n of the virtual managed printer, based on the information identifying the device information receiving section of the virtual managed printer that sent the reply (refer to step 506). Then, the transfer module 509 changes a sending destination IP address to an IP address 172.24.3.1 of the integrated management printer and transfers the received packet (refer to step 507).

Then, the transfer module 509 determines whether a processing termination command is received from a user (refer to step 508). When no processing termination command is received (i.e., NO in step 508), the transfer module 509 returns to the step 503 to repeat the above-described processing (refer to step 508). When a processing termination command is received (i.e., YES in step 508), the transfer module 509 unbinds the virtual managed printer from the IP address 172.24.2.n from (refer to step 509) and terminates the processing (refer to step 510).

As described above, the above-described transfer module can realize the processing comparable with the filtering processing of the seventh exemplary embodiment, even when the web server software has no web service response filter or when the communication protocol does not comply with the web service.

Tenth Exemplary Embodiment

According to the ninth exemplary embodiment, a reply to the transfer module includes the information identifying the device information receiving section of the virtual managed printer that sent the reply. However, the device information receiving section can use a port differentiated for each virtual managed printer to send a reply to the transfer module. In such a case, the port information can be used to identify the device information receiving section of the virtual managed printer that sent the reply.

FIG. 31 shows a port to virtual IP address conversion table that lists port numbers of the transfer module to which the device information receiving section of each virtual managed printer sends a reply. For example, when the self IP address is 172.24.2.1, the device information receiving section of each virtual managed printer sends a reply to a port 501 of the transfer module 172.24.1.1 based on the conversion table. Similarly, when the self IP address is 172.24.2.2, a reply is sent to a port 502 of the transfer module 172.24.1.1. Furthermore, when the self IP address is 172.24.2.3, a reply is sent to a port 503 of the transfer module 172.24.1.1.

Meanwhile the transfer module, in response to reception of a reply, can identify the device information receiving section that sent the reply, with reference to the relationship shown in the conversion table. For example, when a reply is sent to the port 501 of the IP address 172.24.1.1, the sender IP address is rewritten to 172.24.2.1 (refer to step 506).

Furthermore, when a reply is sent to the port 502 of the IP address 172.24.1.1, the sender of this reply is the device information receiving section allocated to the IP address 172.24.2.2. Thus, in the step 506 of FIG. 30, the sender IP address is rewritten into 172.24.2.2. Similarly, when a reply is sent to the port 503 of the IP address 172.24.1.1, the sender of this reply is the device information receiving section allocated to the IP address 172.24.2.3. Thus, in the step 506 of FIG. 30, the sender IP address is rewritten into 172.24.2.3. In particular, the present exemplary embodiment is effective for a managed printer that returns an asynchronous reply.

Figure 32:
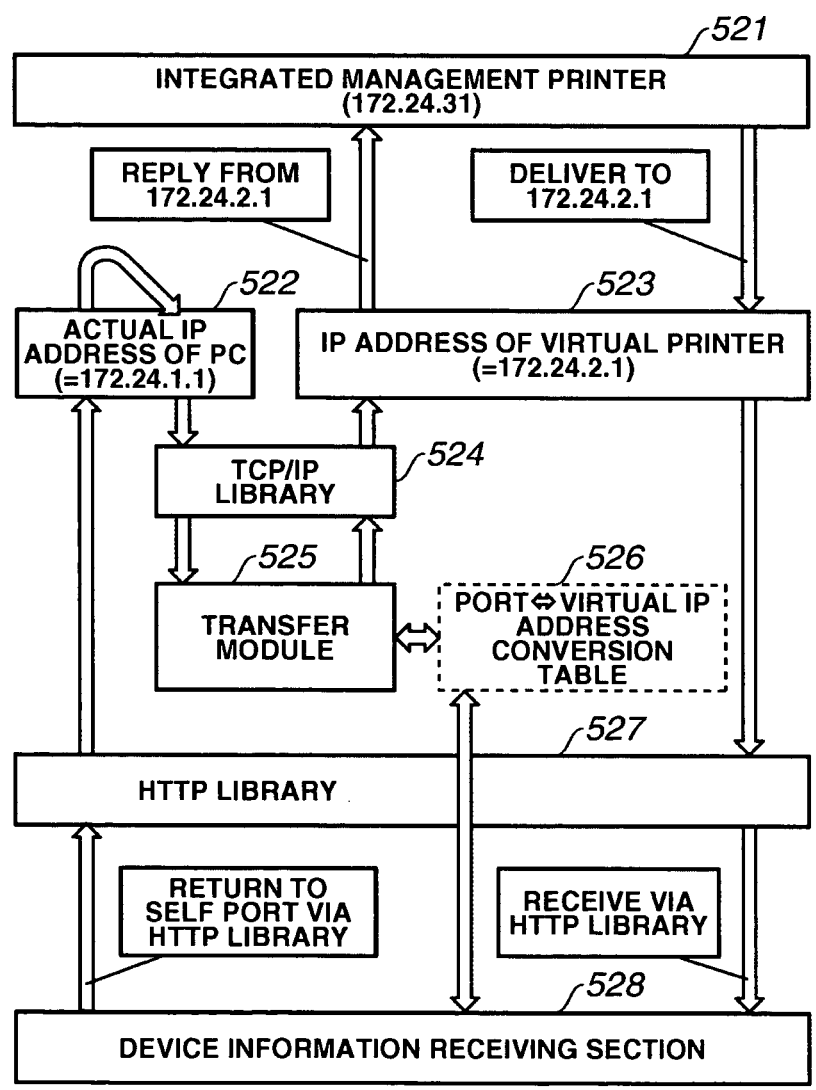
FIG. 32 is an diagram showing a managed printer that transmits an asynchronous reply in accordance with the tenth exemplary embodiment similar to the system of FIG. 29.

FIG. 32 shows an example of the managed printer that returns an asynchronous reply. More specifically, according to the example shown in FIG. 32, an integrated management printer 521 distributes device information to a managed printer based on a web service request, while the managed printer returns a reply to the integrated management printer based on another asynchronous web service request. In this case, in the web service request of the reply, the integrated management printer is requested to perform the processing of "waiting for socket connection". Such an asynchronous communication can be used, for example, when the managed printer requires a significant time to execute the processing for receiving the device information.

In FIG. 32, the integrated management printer 521 distributes the device information via the IP address 523 (i.e., 172.24.2.1) of a virtual managed printer to a device information receiving section 528 based on a web service request. The distribution request is completed before confirming a reply relating to success/failure returned from the device information receiving section 528. The device information receiving section 528, after completing the processing for the distributed device, sends a reply to an IP address 522 (i.e., 172.24.1.1) inherently allocated to the simulator agent PC, not to the IP address of the integrated management printer 521, based on a web service request.

The device information receiving section 528 executes the above-described reception and transmission processing via an HTTP library 527. In this case, the device information receiving section of the virtual managed printer that sent the reply to the IP address 172.24.1.1 can be identified in the reply with reference to the port to virtual IP address conversion table 526 shown in FIG. 31. In the IP address 172.24.1.1, a transfer module 525 installed in the simulator agent software can execute the processing similar to the filtering processing of the seventh exemplary embodiment, and can transfer the reply to the integrated management printer 521. The processing of the transfer module 524 is substantially identical with the processing of the ninth exemplary embodiment described with reference to the flowchart of FIG. 30.

However, in the step 506 of FIG. 30, the transfer module 524 rewrites the sender IP address of the reply packet to 172.24.2.n with reference to the port to virtual IP address conversion table 526. The transfer module 524 executes the reception and reply processing via a TCP/IP library 524.

The present exemplary embodiment can be independent from the above-described processing similar to the filtering processing of the seventh exemplary embodiment. For example, the HTTP library 527 or a reply portion of the managed printer has no function of changing the sender IP address of the ordinary web service request. However, in the present exemplary embodiment, the TCP/IP library 524 and the transfer module 525 can execute the transferring processing while providing the function of changing the sender IP address. Thus, the communication simulation applied to numerous managed printers can be realized without requiring the HTTP library 527 or the reply portion of the managed printer to have the function of changing the sender IP address.

Eleventh Exemplary Embodiment

According to the above-described tenth exemplary embodiment, the integrated management printer distributes the device information to the managed printer based on a web service request and the managed printer returns a reply to the integrated management printer based on another asynchronous web service request.

Furthermore, using the port to virtual IP address conversion table in the processing of the device information receiving section and the transfer module is effective in an asynchronous web service communication requiring a significant time. However, the port to virtual IP address conversion table can be effectively used even when a notification packet including a relatively small amount of data is sent from the integrated management printer and acquirement of device information is actively performed by the managed printer.

For example, the integrated management printer can send a very small TCP/IP or UDP/IP packet to the device information receiving section, as a packet notifying that device information to be distributed is present in the integrated management printer. In this case, the managed printer receives the notification packet and issues a web service request to the integrated management printer and acquires the device information to be distributed.

Figure 33:
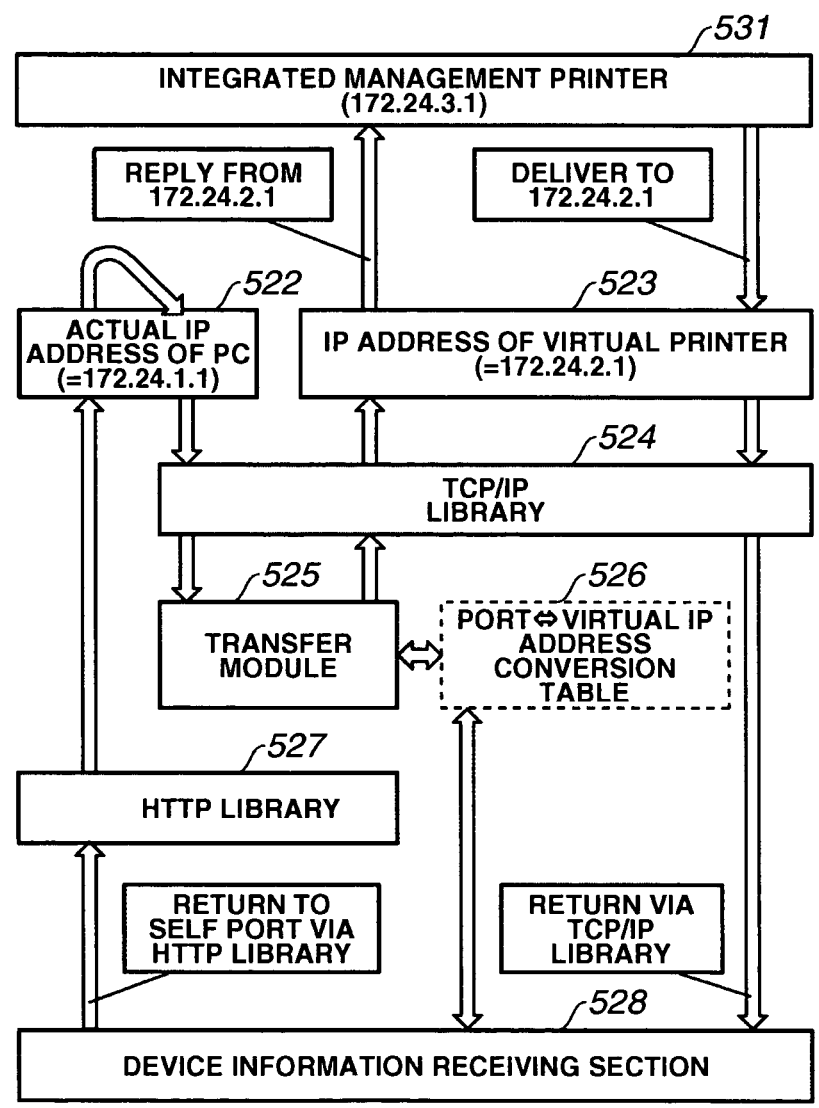
FIG. 33 is an diagram showing a TCP/IP notification packet in accordance with an eleventh exemplary embodiment of the present invention similar to the system of FIG. 29.

FIG. 33 shows an example of a TCP/IP notification packet. The arrangement shown in FIG. 33 differs from the arrangement shown in FIG. 32 in that an integrated management printer 531 sends a device information existence notification to a device information receiving section 528 via TCP/IP and TCP/IP library 524. The device information existence notification, performed as TCP/IP communications, is once completed. Then, in FIG. 33, the device information can be acquired based on a web service request, sent from the device information receiving section 528 to the integrated management printer 531, which is different from the device information existence notification.

Figure 34:
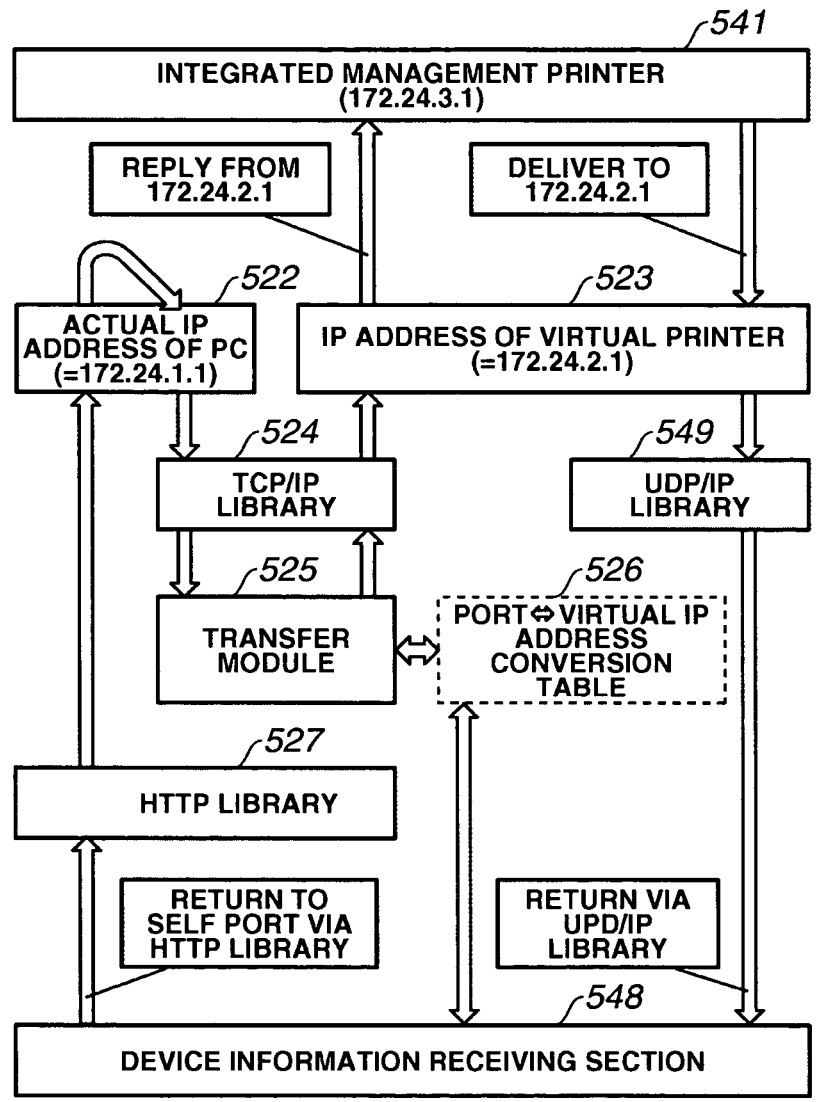
FIG. 34 is a diagram showing a UDP/IP notification packet in accordance with the tenth exemplary embodiment similar to the system of FIG. 29.

Furthermore, FIG. 34 shows an example of a UDP/IP notification packet. The arrangement shown in FIG. 34 differs from the arrangement shown in FIG. 33 in that an integrated management printer 541 sends a device information existence notification to a device information receiving section 528 via UDP/IP and UDP/IP library 549. Then, in FIG. 34, the device information can be acquired based on a web service request, sent from the device information receiving section 528 to the integrated management printer 541, which is different from the device information existence notification.

Twelfth Exemplary Embodiment

According to the above-described ninth, tenth, and eleventh exemplary embodiments, both the transfer module and the device information receiving section of the virtual managed printer can operate on the simulator agent PC. However, when plural simulator agent PCs are available, the transfer module and the device information receiving section of the virtual managed printer can operate on different simulator agent PCs.

Other Exemplary Embodiment

To realize the present invention, program codes or a storage medium storing the program codes can be used to realize the functions of the above-described exemplary embodiments, i.e., the processing of the flowcharts shown in FIG. 8 or others.

Furthermore, to realize the present invention, a computer (or CPU or MPU) of a system or an apparatus can read the program codes from a storage medium and can operate according to the readout program codes. In this case, the program codes read out from the storage medium can realize the functions of the above-described exemplary embodiments. The present invention encompasses any storage medium capable of storing the program codes.

A storage medium supplying the program code(s) can be selected from any one of flexible disk, hard disk, optical disk, magneto-optical disk, MO, CD-ROM, CD-R, CD-RW, magnetic tape, nonvolatile memory card, ROM, and DVD (DVD-ROM, DVD-R).

When the computer reads and executes the program codes, the functions of the above-described exemplary embodiments can be realized. Furthermore, based on an instruction of the program codes, the operating system running on the computer may execute part or all of the processing so that the functions of the above-described exemplary embodiments can be realized.

Furthermore, the program codes can be written into a memory of a feature expansion board equipped in a computer or into a memory of a feature expansion unit connected to the computer. In this case, based on an instruction of the program codes, the CPU provided on the feature expansion board or the feature expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application Nos. 2005-111285 filed Apr. 7, 2005 and 2006-006076 filed Jan. 13, 2006, which are hereby incorporated by reference herein in its entirety.

What is claimed is:

1. An evaluation method for receiver software installed into an information processing apparatus which is capable of communicating with a client computer via a network, wherein the receiver software is operable so as to bind an IP address in association with one image forming apparatus, and to virtually realize functions including waiting for transmission, receiving and replying, the evaluation method comprising:

binding, by the receiver software, a different IP address, and waiting for transmission from the client computer;

transmitting, by the client computer, predetermined setting information of the image forming apparatus via the network to the receiver software;

acquiring, by the client computer, a reply from the receiver software in response to the transmission of the predetermined setting information;

displaying, by the client computer, a communication result based on contents of the acquired reply; and evaluating the receiver software based on content of the display.

2. The evaluation method according to claim 1, wherein response content change software is installed into the information processing apparatus on which the receiver software is installed, the evaluation method further comprising:

determining, by the response content change software, in response to reception of data transmitted from the client computer, whether or not processing performed on the received data is predetermined processing, and rewriting, by the response content change software, the contents of the predetermined setting information, based on an IP address relating to the reception, in a case where it is determined that the processing performed on the received data is the predetermined processing.

3. The evaluation method according to claim 1, wherein response content change software is installed into the information processing apparatus on which the receiver software is installed, the evaluation method further comprising:

determining, by the response content change software, in response to reception of data transmitted from the client computer, whether or not processing performed on the received data is predetermined processing, and rewriting, by the response content change software, the contents of the reply from the receiver software, based on an IP address relating to the reception, in a case where it is determined that the processing performed on the received data is the predetermined processing.

4. The evaluation method according to claim 1, wherein response content change software is installed into the information processing apparatus on which the receiver software is installed, the evaluation method further comprising:

determining, by the response content change software, in response to reception of data transmitted from the client computer, whether or not processing performed on the received data is predetermined processing, and rewriting, by the response content change software, a transmission destination of reply from the receiver software, based on an IP address relating to the reception, in a case where it is determined that the processing performed on the received data is the predetermined processing.

5. The evaluation method according to claim 1, further comprising setting the number of the receiver software which operates in the information processing apparatus.

6. The evaluation method according to claim 1, wherein in the acquiring step, the predetermined setting information transmitted to the plurality of receiver software, a hash value of the transmitted predetermined setting information, or a checksum of the transmitted predetermined setting information is acquired, and wherein in the display step, the acquired predetermined setting information, the acquired hash value, or the acquired checksum is displayed as the communication result.

7. The evaluation method according to claim 1, wherein web service server software and a web service which is operable to control the plurality of receiver software are each installed into the information processing apparatus on which the receiver software is installed, and wherein the client computer and the plurality of receiver software perform transmission and reception via the web service server software and the web service, the evaluation method further comprising:

determining, by the web service server software which operates in the information processing apparatus, in response to reception of data transmitted from the client computer, whether or not processing performed on the received data is predetermined processing, and rewriting, by the web service server software which operates in the information processing apparatus, an IP address of receiver software to be subject to the web service, based on an IP address relating to the reception, in a case where it is determined that the processing performed on the received data is the predetermined processing.

* * * * *